United States Patent
Liggesmeyer et al.

(10) Patent No.: US 7,823,015 B2
(45) Date of Patent: Oct. 26, 2010

(54) METHOD AND DEVICE FOR DETERMINING A FULL ERROR DESCRIPTION FOR AT LEAST ON PART OF A TECHNICAL SYSTEM COMPUTER PROGRAM ELEMENT AND COMPUTER-READABLE STORAGE MEDIUM

(75) Inventors: Peter Liggesmeyer, Potsdam (DE); Manfred Lohner, München (DE); Oliver Mäckel, München (DE); Martin Rothfelder, München (DE)

(73) Assignee: Siemens Aktiengesellschaft, Munich (DE)

( * ) Notice: Subject to any disclaimer, the term of this patent is extended or adjusted under 35 U.S.C. 154(b) by 1060 days.

(21) Appl. No.: 10/468,427

(22) PCT Filed: Jan. 28, 2002

(86) PCT No.: PCT/DE02/00315

§ 371 (c)(1),
(2), (4) Date: Aug. 19, 2003

(87) PCT Pub. No.: WO02/067119

PCT Pub. Date: Aug. 29, 2002

(65) Prior Publication Data

US 2004/0078736 A1 Apr. 22, 2004

(30) Foreign Application Priority Data

Feb. 20, 2001 (DE) ................. 101 08 053

(51) Int. Cl.
G06F 11/00 (2006.01)

(52) U.S. Cl. .................... 714/25; 714/28; 714/30; 714/44

(58) Field of Classification Search ............ 714/28, 714/44, 25, 30

See application file for complete search history.

(56) References Cited

U.S. PATENT DOCUMENTS 4,737,956 A * 4/1988 Zombolas .............. 714/801

(Continued)

FOREIGN PATENT DOCUMENTS

| DE | 197 07 065 | 9/1998 |
|---|---|---|
| WO | WO 00/73903 | 12/2000 |
| WO | WO 00/75780 | 12/2000 |

OTHER PUBLICATIONS

Sang Hoon Han et al., "Development of a Computer Code AFTC for Fault Tree Construction Using Decision Table Method and Super Component Concept", Reliability Engineering and System Safety, vol. 15, 1989, pp. 15-31.

(Continued)

Primary Examiner—Scott T. Baderman
Assistant Examiner—Loan L. T. Truong
(74) Attorney, Agent, or Firm—Staas & Halsey LLP

(57) ABSTRACT

Disclosed is a full error description for a technical system which is described by a system description which can be processed by a computer and stored. The system description contains information on elements available in system and information on the links therebetween. An element error description is determined for each element taken into consideration, using a stored error description which is respectively associated with a reference element. At least one part of the reference elements is grouped into a reference element group and a group error description is determined for the reference elements of a reference element group using a stored group error description which is respectively associated with a reference element group, enabling possible errors of the reference elements of the reference element group to be described. A full error description is determined from the element error descriptions and the group error descriptions, taking into account information on element links.

7 Claims, 19 Drawing Sheets

U.S. PATENT DOCUMENTS

| | | | | |
|---|---|---|---|---|
| 4,853,928 | A * | 8/1989 | Williams | 714/724 |
| 4,870,575 | A * | 9/1989 | Rutenberg | 716/4 |
| 5,127,005 | A * | 6/1992 | Oda et al. | 714/26 |
| 5,210,704 | A * | 5/1993 | Husseiny | 702/34 |
| 5,305,426 | A * | 4/1994 | Ushioda et al. | 706/52 |
| 5,369,756 | A * | 11/1994 | Imura et al. | 714/26 |
| 5,481,699 | A * | 1/1996 | Saether | 714/15 |
| 5,544,308 | A * | 8/1996 | Giordano et al. | 714/26 |
| 5,561,762 | A * | 10/1996 | Smith et al. | 714/33 |
| 5,606,669 | A * | 2/1997 | Bertin et al. | 709/223 |
| 5,799,294 | A * | 8/1998 | Tanaka | 706/46 |
| 6,223,143 | B1 * | 4/2001 | Weinstock et al. | 703/17 |
| 6,374,196 | B1 * | 4/2002 | Hashimoto et al. | 702/183 |
| 6,378,094 | B1 * | 4/2002 | Chakraborty et al. | 714/727 |
| 6,467,051 | B1 * | 10/2002 | Browen et al. | 714/30 |
| 6,499,117 | B1 * | 12/2002 | Tanaka | 714/49 |
| 6,535,227 | B1 * | 3/2003 | Fox et al. | 715/736 |
| 6,560,736 | B2 * | 5/2003 | Ferguson et al. | 714/724 |
| 6,961,871 | B2 * | 11/2005 | Danialy et al. | 714/30 |
| 7,017,080 | B1 * | 3/2006 | Liggesmeyer et al. | 714/26 |
| 7,200,525 | B1 * | 4/2007 | Williams et al. | 702/185 |
| 2001/0049802 | A1 * | 12/2001 | Shigeta | 714/25 |
| 2002/0184560 | A1 * | 12/2002 | Wang et al. | 714/25 |
| 2004/0042418 | A1 * | 3/2004 | Hamada et al. | 370/256 |
| 2004/0078736 | A1 * | 4/2004 | Liggesmeyer et al. | 714/57 |
| 2004/0139369 | A1 * | 7/2004 | Kirschner | 714/25 |
| 2004/0264364 | A1 * | 12/2004 | Sato | 370/217 |

OTHER PUBLICATIONS

Leonidas Camarinopoulos et al., "A Method for Automatic Fault Tree Synthesis", Applied Informatics, vol. 27, No. 9, Sep. 1, 1985, pp. 389-399, Abstract.

Peter Liggesmeyer et al., Quantifying the Reliability of Embedded Systems by Automated Analysis, International Conference on Dependable Systems and Networks, Proceedings, Jul. 1, 2001, pp. 89-94.

Ronald C. De Vries, "An Automated Methodology for Generating a Fault Tree", IEEE Transactions on Reliability, vol. 39, No. 1, Apr. 1990, pp. 76-86.

DIN 25424-1: Fehlerbaumanalyse, Methoden und Bildzeichen, Sep. 1981, Abstract.

DIN 25434-2: Fehlerbaumanalyse; Handrechenverfahren zur Auswertung eines Fehlerbaums, Apr. 1990, Berlin, Beuth-Verlag GmbH, Abstract.

Nancy G. Leveson et al., "Safety Verification of ADA Programs Using Software Fault Trees", IEEE Software, pp. 48-59, Jul. 1991.

Peter Liggesmeyer et al., "Automation of Augmented Fault Tree Analyses of Complex Technical Systems" AT-Automatisierungstechnik 48 (2000) 2, p. 67-76, Abstract.

* cited by examiner

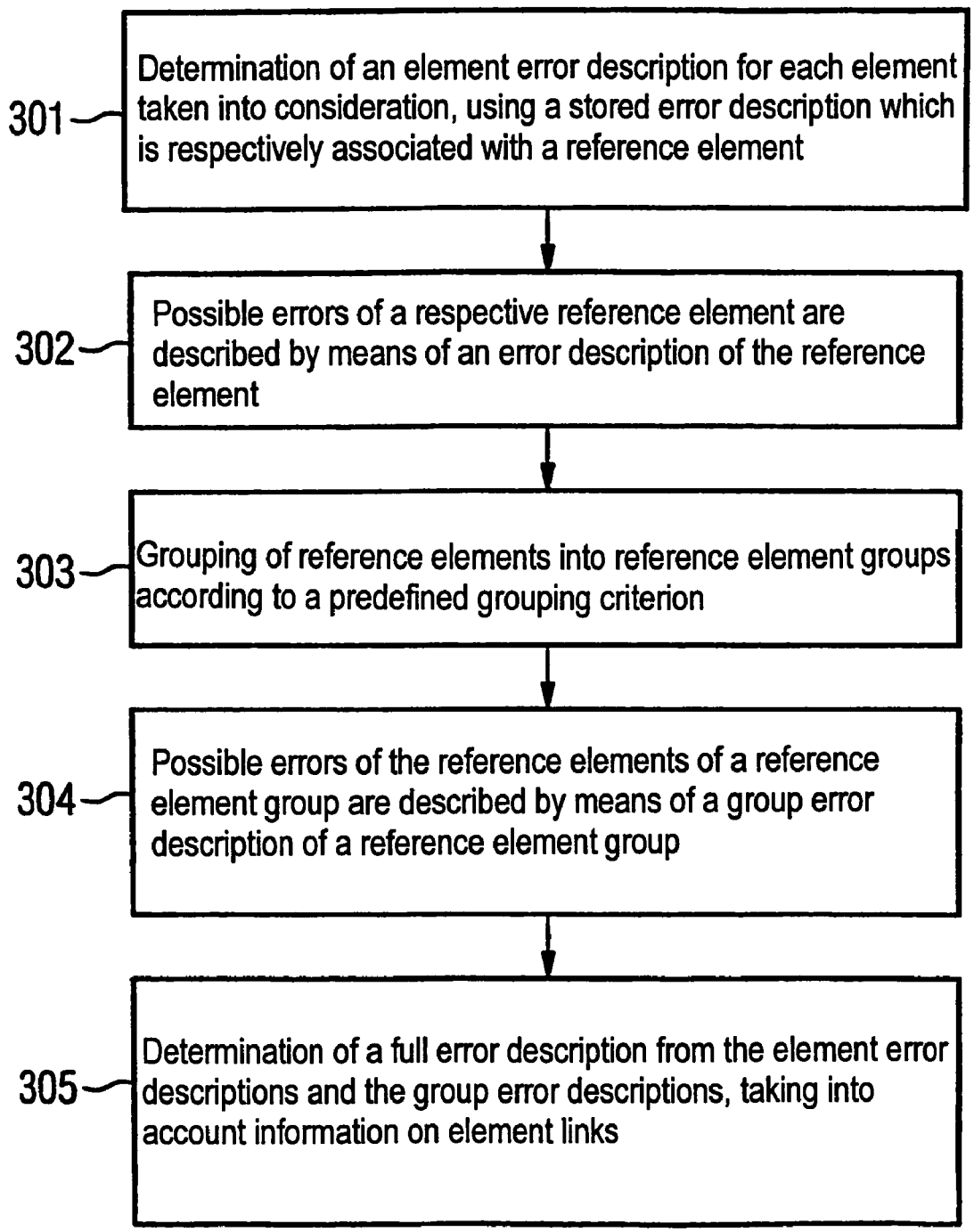

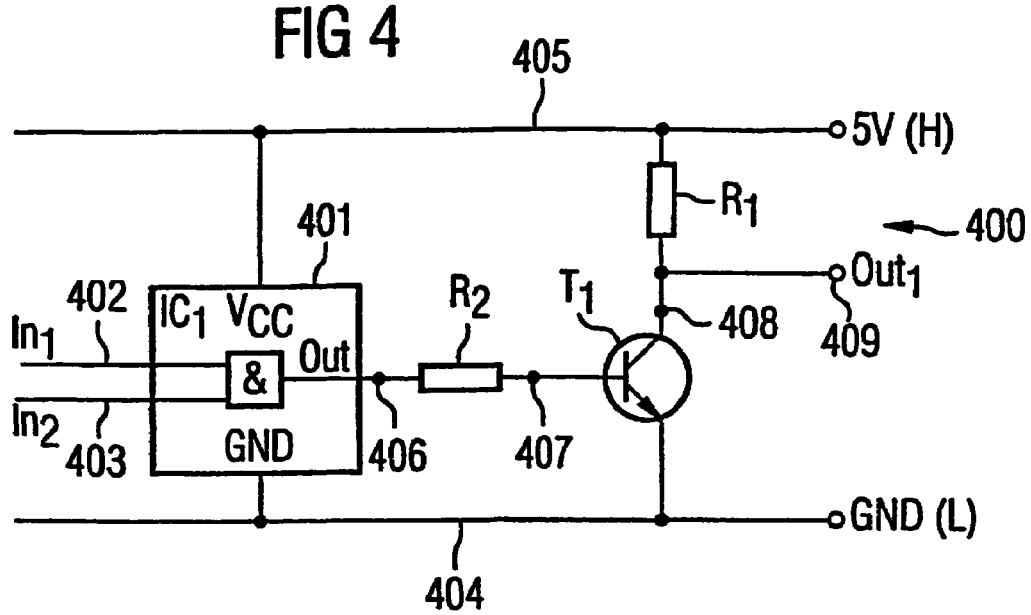
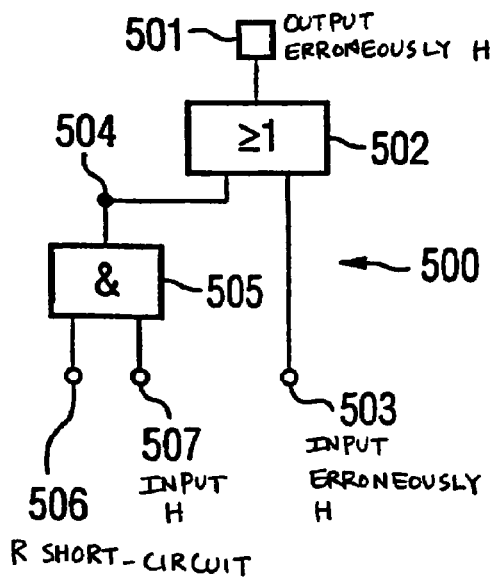
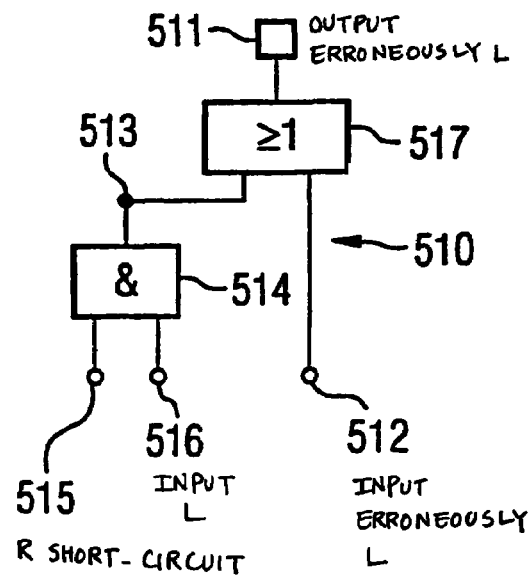

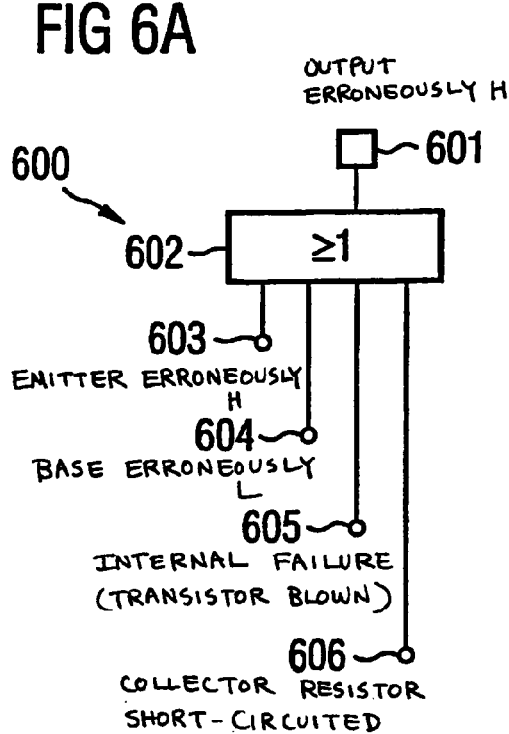
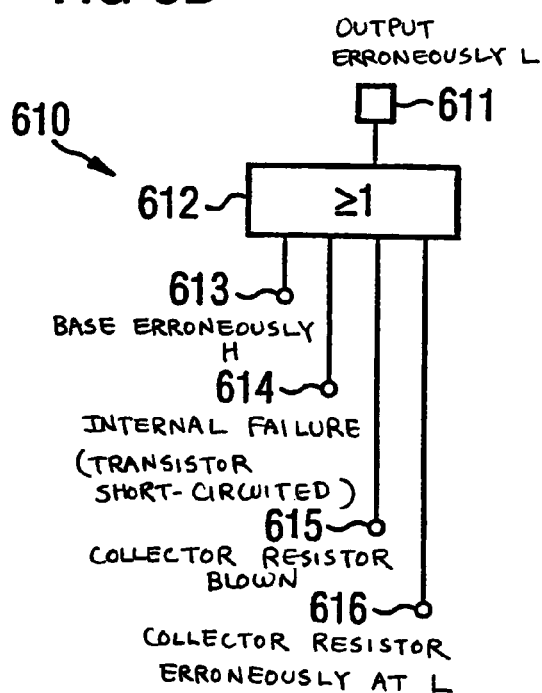
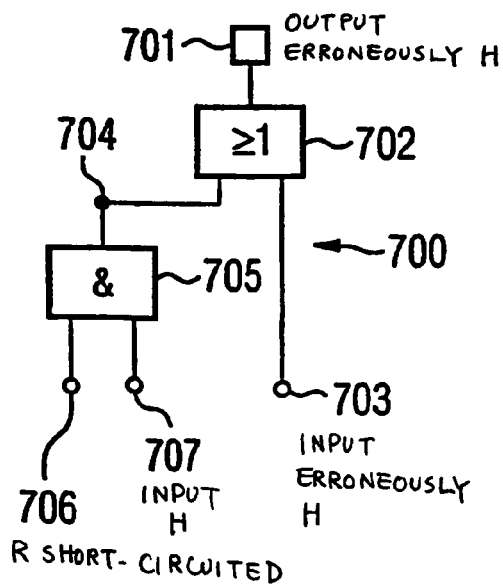
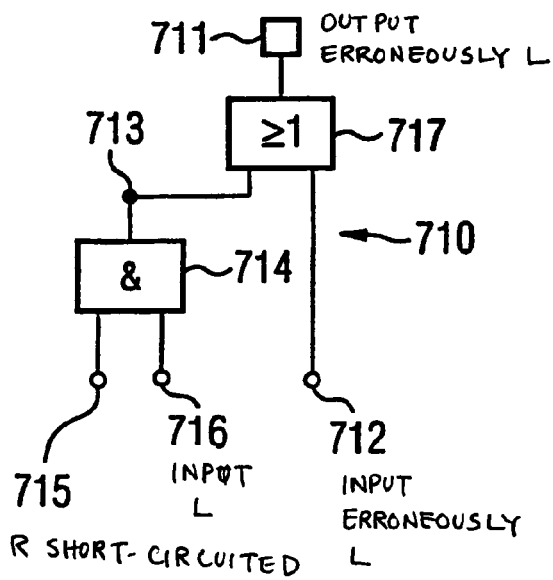

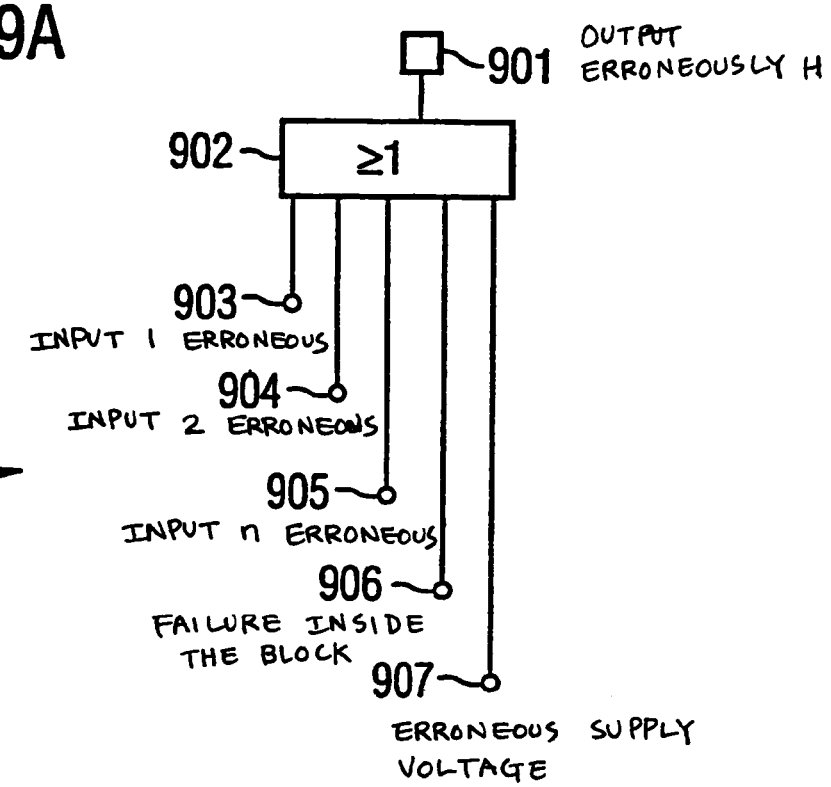
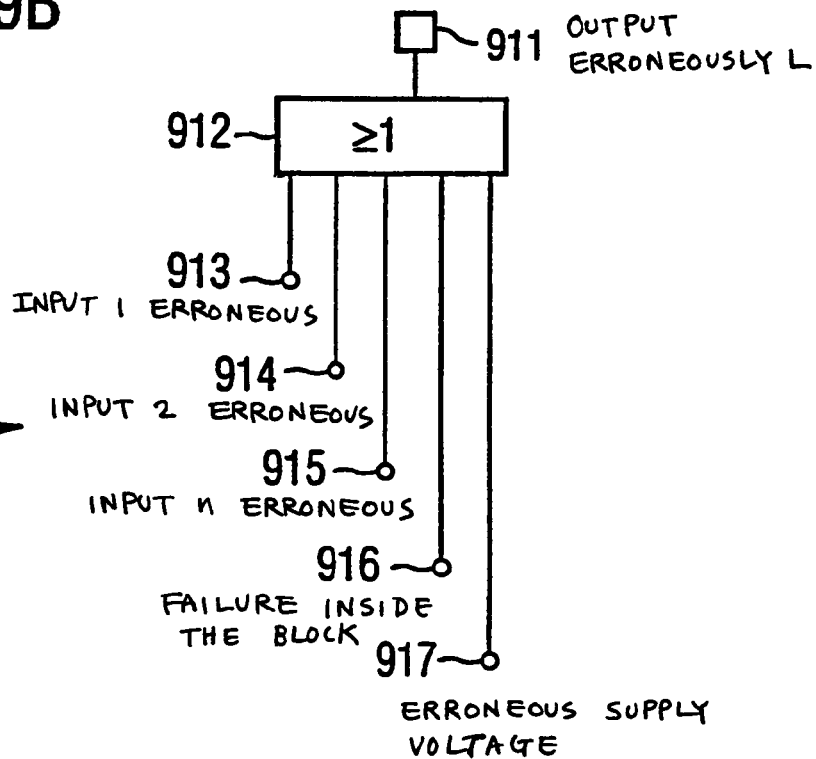

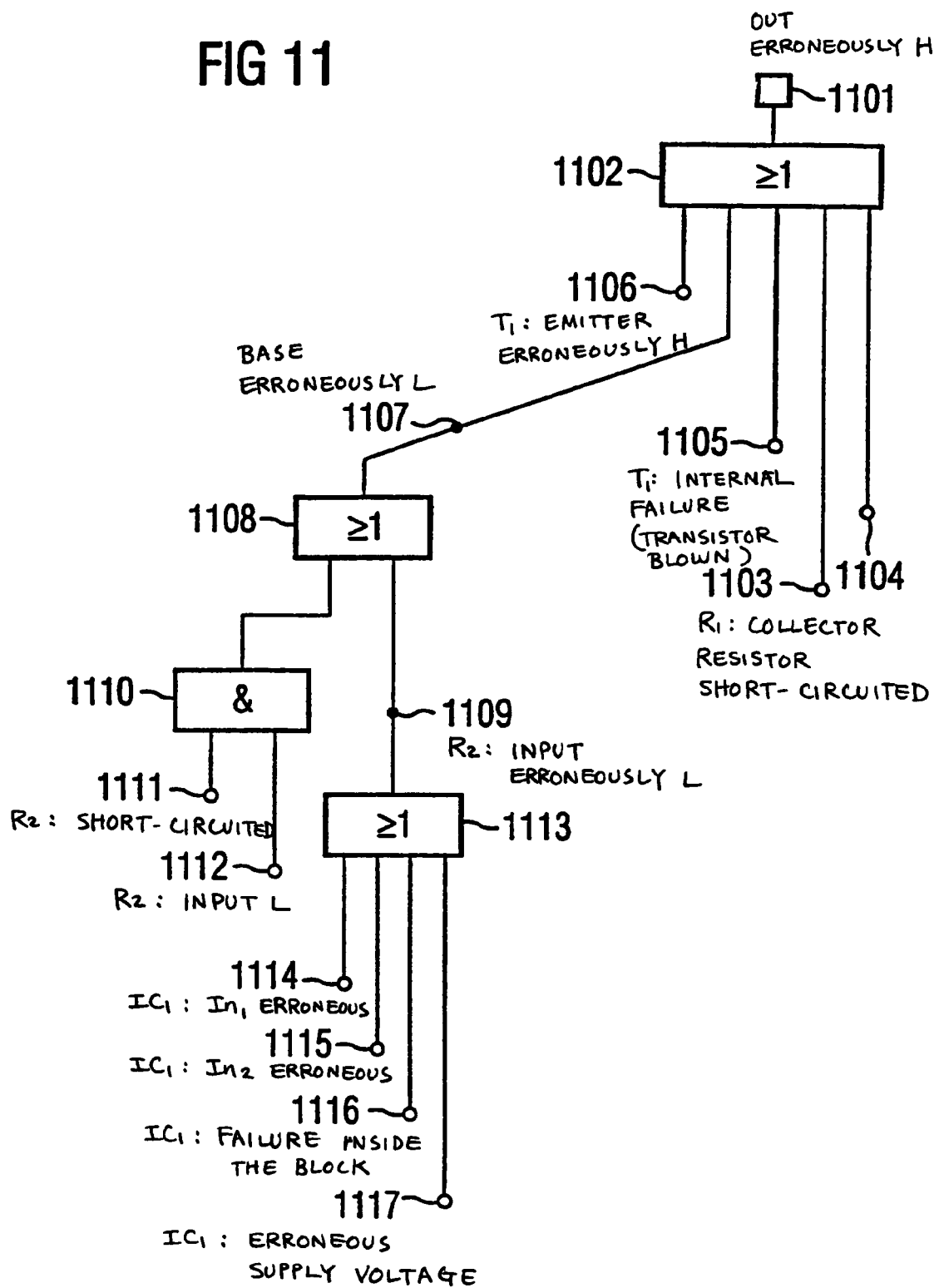

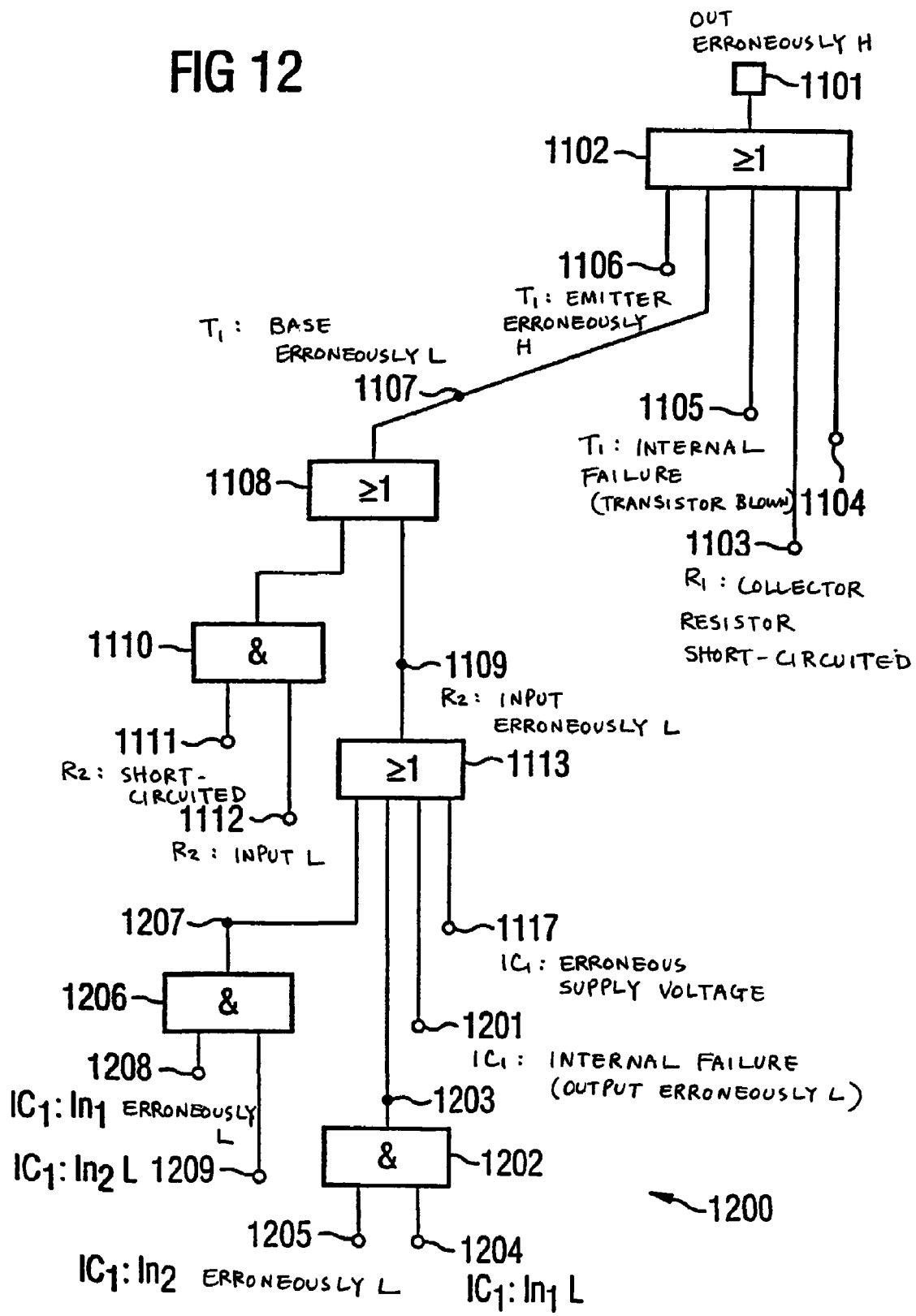

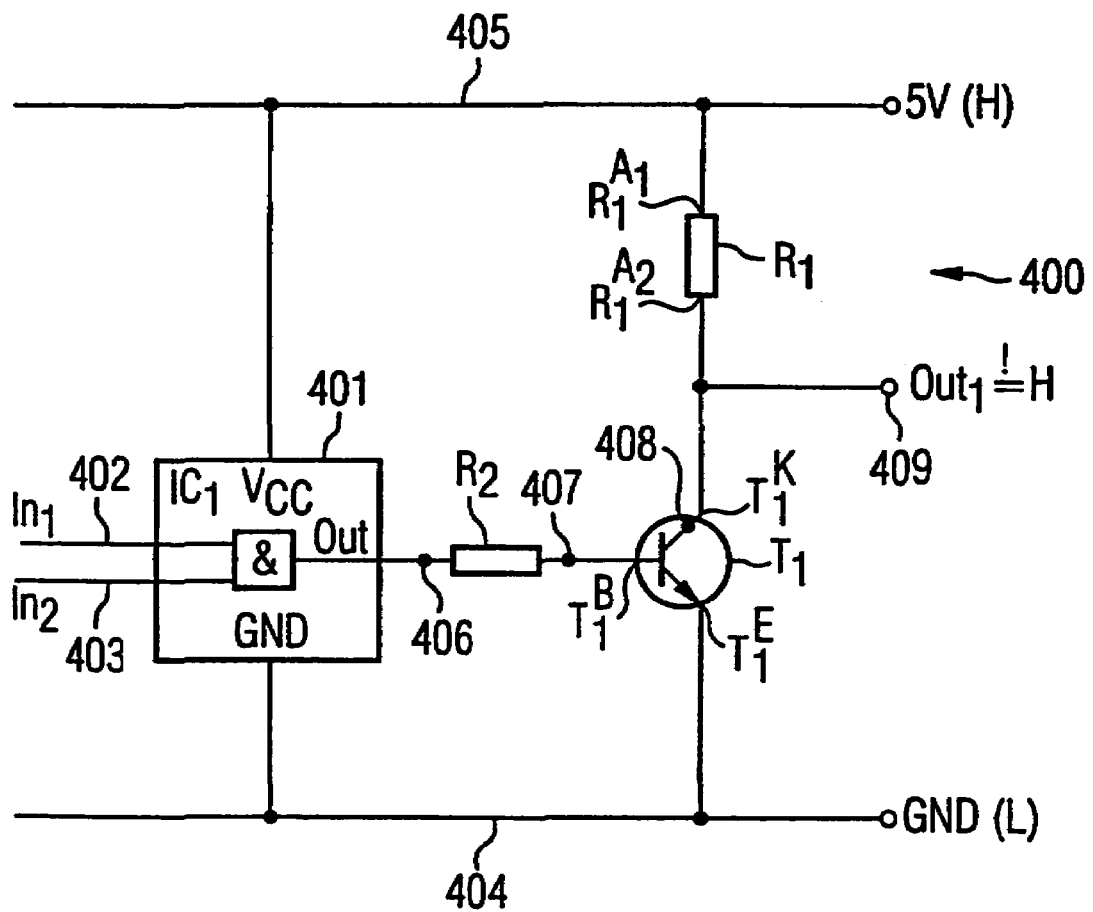

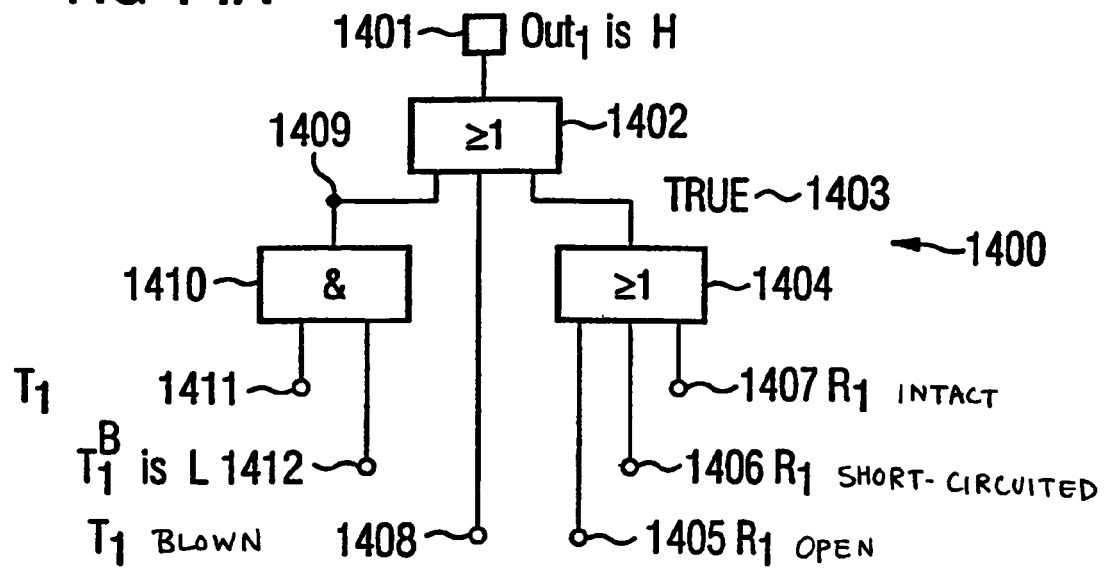
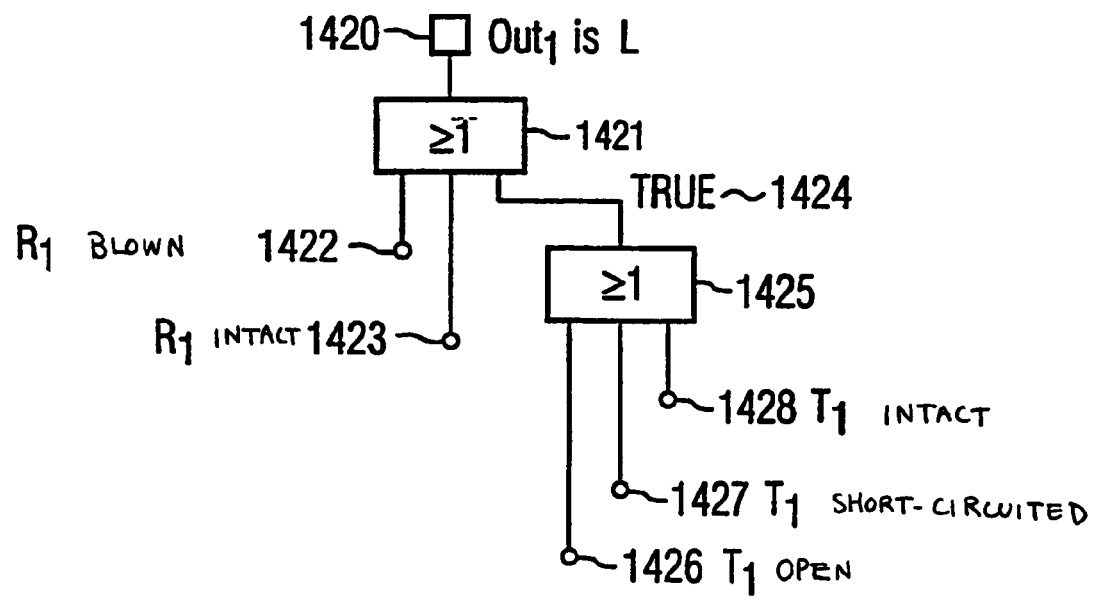

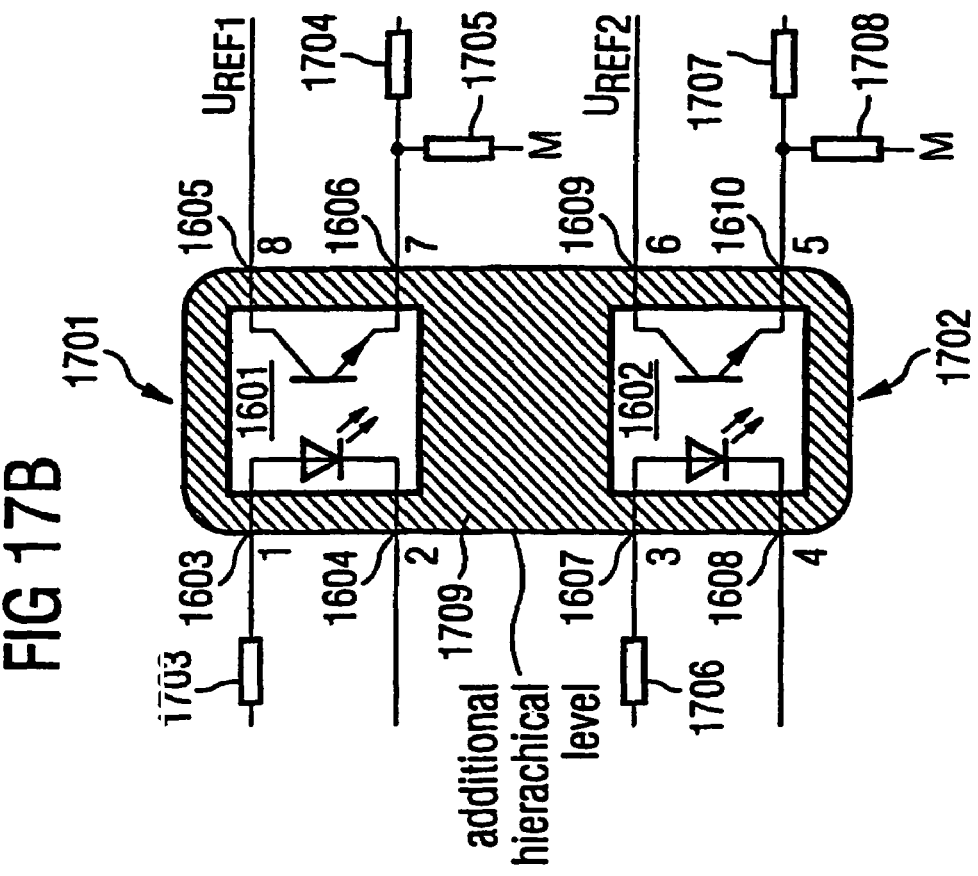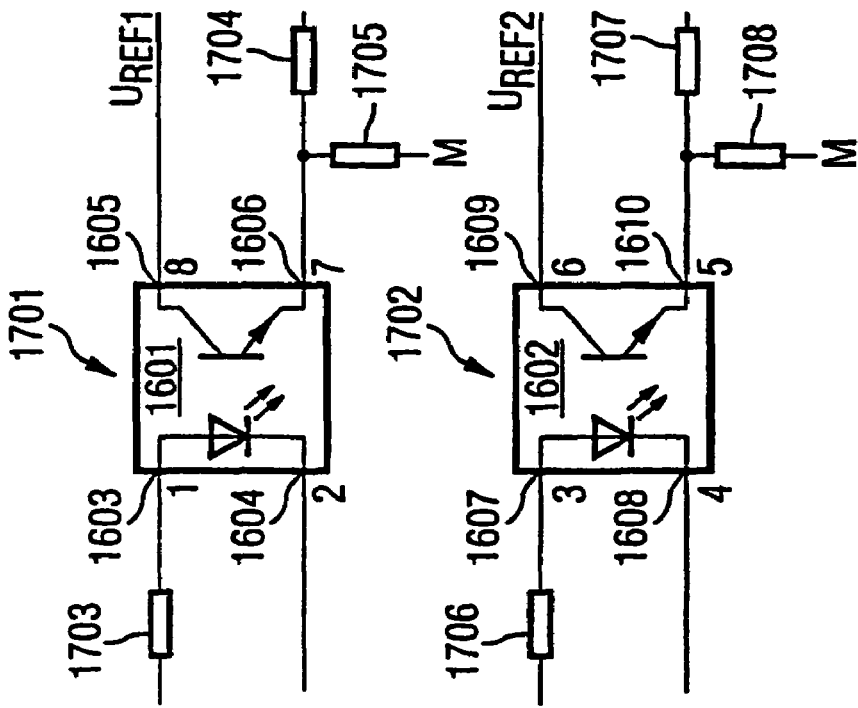

METHOD AND DEVICE FOR DETERMINING A FULL ERROR DESCRIPTION FOR AT LEAST ON PART OF A TECHNICAL SYSTEM COMPUTER PROGRAM ELEMENT AND COMPUTER-READABLE STORAGE MEDIUM

CROSS REFERENCE TO RELATED APPLICATIONS

This application is based on and hereby claims priority to PCT Application No. PCT/DE02/00315 filed on Feb. 28, 2002 and German Application No. 101 08 053.0 filed on Feb. 20, 2001, the contents of which are hereby incorporated by reference.

BACKGROUND OF THE INVENTION

The invention relates to the determination of a full error description for at least one part of a technical system.

Such a method is known where an error description is determined manually in the form of an error tree for a technical system.

Due to the manual determination of the error description, the uncoordinated and therefore unsystematic compilation of the error description in particular and therefore the possible incompleteness and lack of formally demonstrable correctness of the error tree determined are considerable drawbacks. These drawbacks take on considerable significance in particular in the case of complex safety-critical systems, the development of which has to be subject to high requirements.

A further drawback in the case of manual determination of an error tree can be seen in the fact that it frequently cannot be determined within a planned time and cost frame due to the exceptional complexity of the system to be described. The quality of a manually compiled error tree is therefore doubtful in relation to any proof of safety which may possibly be required. In particular, there is a danger that critical situations within the system are not noticed, which could result in threats to the technical system.

An error tree, as described in DIN 25424-1: Fehlerbaumanalyse, Methoden und Bildzeichen ("Error tree analysis, methods and graphic symbols"), September 1981, means a structure which describes logical relationships between input variables of the error tree, which input variables result in a predefined undesirable result.

Principles relating to error tree analysis are known from DIN 25424-2: Fehlerbaumanalyse; Handrechenverfahren zur Auswertung eines Fehlerbaums ("Error tree analysis; manual calculation method for evaluating an error tree"), April 1990, Berlin, Beuth Verlag GmbH ("DIN 25424-2 reference"). Various methods relating to error tree analysis are also described in DIN 25424-2 reference.

A method of compiling an error tree is known from IEEE Software, pages 48-59, July 1991 ("IEEE reference"), where an attempt is made with the error tree, albeit in an unreliable and incomplete manner, to investigate predefined program code using reference error trees for predefined command types of a computer program.

Furthermore, a method of determining a full error description for a technical system is described in P. Liggesmeyer, O. Mäckel, Automatisierung erweiterter Fehlerbaumanalysen für komplexe technische Systeme ("Automation of expanded error tree analysis for complex technical systems"), at Automatisierungstechnik, Oldenbourg Verlag, pp. 67-76, No. 2, February 2000. In this method, a full error description is determined for the technical system which is described by a stored system description which can be processed by the computer. The system description contains information on elements available in the system and on the links between them. An element error description is determined for each element taken into consideration, using a stored error description which is respectively associated with a reference element. A full error description is determined from the element error descriptions, taking into account information on element links.

SUMMARY OF THE INVENTION

One possible aspect of the invention arises from the problem of determining an error description for at least one part of a technical system which is more reliable than an error tree determined by a known method.

In the case of a method for determining a full error description for at least one part of a technical system, by a computer, the system is described by a stored system description which can be processed by the computer. The system description contains information on elements available in the system and on the links between them. An element error description is determined for each element taken into consideration, using a stored error description which is respectively associated with a reference element, by which possible errors of the respective element are described. Possible errors of a respective reference element are described by an error description of the reference element. At least one part of the reference elements is grouped into a reference element group. In other words, a plurality of reference elements is grouped into a reference element group. A group error description is determined for the reference elements of a reference element group using a stored group error description which is respectively associated with a reference element group, by which possible errors of the reference elements of the reference element group are described. A full error description is determined from the element error descriptions and the group error descriptions, taking into account information on element links.

A configuration for determining a full error description for at least one part of a technical system displays a processor which is arranged in such a manner that the following steps can be carried out:

the system is described by a stored system description which can be processed by the configuration, the system description includes information on elements available in the system and on the links between them, an element error description is determined for each element taken into consideration, using a stored error description which is respectively associated with a reference element, by which possible errors of the respective element are described, possible errors of a respective reference element are described by an error description of the reference element, at least one part of the reference elements is grouped into a reference element group, a group error description is determined for the reference elements of a reference element group using a stored group error description which is respectively associated with a reference element group, by which possible errors of the reference elements of the reference element group are described, and a full error description is determined from the element error descriptions and the group error descriptions, taking into account information on element links.

A computer program element contains a computer-readable storage medium on which a program is stored which allows a computer, once it has been loaded into a memory of the computer, to carry out the following steps for the purposes of determining a full error description of at least one part of a technical system:

the system is described by a stored system description which can be processed by the configuration, the system description includes information on elements available in the system and on the links between them, an element error description is determined for each element taken into consideration, using a stored error description which is respectively associated with a reference element, by which possible errors of the respective element are described, possible errors of a respective reference element are described by an error description of the reference element, at least one part of the reference elements is grouped into a reference element group, a group error description is determined for the reference elements of a reference element group using a stored group error description which is respectively associated with a reference element group, by which possible errors of the reference elements of the reference element group are described, and a full error description is determined from the element error descriptions and the group error descriptions, taking into account information on element links.

A program is stored on a computer-readable storage medium which allows a computer, once it has been loaded into a memory of the computer, to carry out the following steps for the purposes of determining a full error description of at least one part of a technical system:

the system is described by a stored system description which can be processed by the configuration, the system description includes information on elements available in the system and on the links between them, an element error description is determined for each element taken into consideration, using a stored error description which is respectively associated with a reference element, by which possible errors of the respective element are described, possible errors of a respective reference element are described by an error description of the reference element, at least one part of the reference elements is grouped into a reference element group, a group error description is determined for the reference elements of a reference element group using a stored group error description which is respectively associated with a reference element group, by which possible errors of the reference elements of the reference element group are described, and a full error description is determined from the element error descriptions and the group error descriptions, taking into account information on element links.

One aspect of the method and system allows a full error description to be determined for at least one part of a technical system where the completeness and also the consistency and absence of errors of the full error description determined is guaranteed.

A further advantage can be seen in the fact that the invention allows automatic determination of the full error description.

Furthermore, the method and system may achieve the result that potentially safety-related relationships between the individual components of the technical system, or in other words between the reference elements of a reference element group, can be detected and therefore taken into account.

The determination of a full error description is therefore also less costly and considerably quicker to carry out than with the known methods and also results in improved consideration of more complex error relationships between components of a component group in the technical system.

In the following, a 'technical system' means a system which can be described by a system description in which individual elements of the technical system and their links with each other are possible for the purposes of describing the technical system. An example of such a technical system can be seen in an electrical circuit configuration which is described for example with the aid of so-called net lists in a structure description language, for example EDIF, SPICE or VHDL. A further example of such a technical system can be seen in an industrial plant, for example a power plant, or a large industrial plant, for example a rolling mill, if the respective plant can be described in terms of its respective elements and their links.

The method and system are therefore not restricted to a very specific technical system but is applicable to any technical system which includes elements which can be described respectively in the context of a system description together with information on the element links.

Reference elements are predefined elements stored in a computer which can be contained in such a respectively considered technical system. An error description is respectively associated with a reference element, by which possible errors of the respective reference element are described. A 'reference element' means for example an elementary device, a block, which can contain devices and further blocks or logically described components, for example an AND gate.

A 'reference element group' means by way of illustration a group of reference elements preferably composed according to a predefined grouping criterion, i.e. grouped, for example a plurality of reference element groups of the same type. An example of such a reference element group is a plurality of logic gates with a specific functionality, for example a plurality of:

AND gates,
EXCLUSIVE OR gates,
NAND gates,
AND gates,
INCLUSIVE-OR gates.

Furthermore, devices of the same type, for example optocouplers, amplifier elements, etc, can also be respectively grouped into a reference element group. In general, the grouping can be effected according to a freely predefinable grouping rule.

Preferred developments of invention result from the dependent claims.

The group error description can contain at least one error which has an effect on several reference elements of the reference element group. This version allows errors which, for example in the case of components which are implemented together on one chip but are connected in different local areas of the overall system, e.g. of an overall electrical circuit, occur on the chip and therefore result in a plurality of errors in different circuit areas, to be determined very quickly and simply.

The system description can be present in a hardware structure description language, for example in EDIF, SPICE, VHDL, etc.

Furthermore, the system description can include information on an information flow direction which indicates the direction in which information is propagated within the technical system. The determination of the full error description can be effected taking account of the information flow direction in this case.

Consequently, the determination of the full error description is further simplified and therefore even quicker to carry out.

In one development, the error description can be present in the form of a stored error tree. The element error description is determined as an element error tree and the full error description is determined as a full error tree in this case.

This development allows a standardized analysis of the technical system which ensures easier understanding of the full error description by a user since users accept a standardized representation of the full error description more easily and in clearer form.

In a further version, the error description can be present in the form of an equation which describes possible states of the reference element. In this case, the element error description is determined as an element equation and the full error description as a full error equation.

This version allows interactions between individual elements of the technical system to be taken into account in a simple manner. The behavior of the individual elements of the technical system in the normal case and in the presence of failures, i.e. errors, is customarily described respectively by a Boolean equation. The equation system is solved for the considered predefined undesirable effect of the respective error description.

The full error equation can be converted into a full error tree.

At least one reference element can describe an element of an electrical circuit, for example an electrical resistor, a capacitor, an electrical coil, a transistor, an operational amplifier, etc.

The method and system can be employed advantageously for the purposes of error analysis of the technical system, for example by employing the methods described in IEEE reference.

In a further version, the full error description is determined as a full error tree and the full error tree is changed in relation to predefinable framework conditions, for example by adding a supplementary error tree.

This further version allows the determination of the full error description and the full error description itself to become more flexible and therefore, for a user, easier to handle and easier to adapt to actual requirements in the analysis of the technical system.

Such a framework condition can be an additional condition in relation to electromagnetic compatibility of an electrical circuit, which is also described in the form of an error tree and is fed into the full error description in the form of a supplementary error tree.

The method and system can be implemented both in software and also in hardware.

The developments described above apply both to the method, the configuration, the computer program element and also the computer-readable storage medium.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 3 is a further flowchart in which individual steps of the exemplary embodiments are represented;

FIG. 4 is a circuit configuration on the basis of which the exemplary embodiments are represented;

FIGS. 5a and 5b are a representation of two error trees for an electrical resistor;

FIGS. 6a and 6b are a representation of two error trees for a transistor in common emitter connection;

FIGS. 7a and 7b are a representation of two error trees for an electrical capacitor;

FIGS. 9a and 9b are a representation of two error trees for a general block which represents an electrical element with a plurality of inputs and one output;

FIG. 11 is a representation of a full error tree for the circuit configuration in FIG. 4;

FIG. 12 is a representation of a refined full error tree for the circuit configuration in FIG. 4;

FIG. 13 is a sketch of a circuit configuration on the basis of which the second exemplary embodiment is represented;

FIGS. 14a, 14b, 14c and 14d are a representation of four error trees for the purposes of describing the second exemplary embodiment;

FIGS. 17A and 17B are a sketch of two circuits considered independently on one another which respectively display an optocoupler circuit (FIG. 17A) and a sketch of two circuits considered combined into one block which respectively display an optocoupler circuit (FIG. 17B);

FIG. 1 shows a computer 100 with which the methods described in the following are carried out. The computer 100 displays a processor 101 which is connected to a memory 102 via a bus 103. The program 104 which is executed for the purposes of carrying out the methods described in the following is stored in the memory 102. Furthermore, a system description 105, which describes a technical system 115 to be investigated, is stored in the memory 102.

Figure 1:
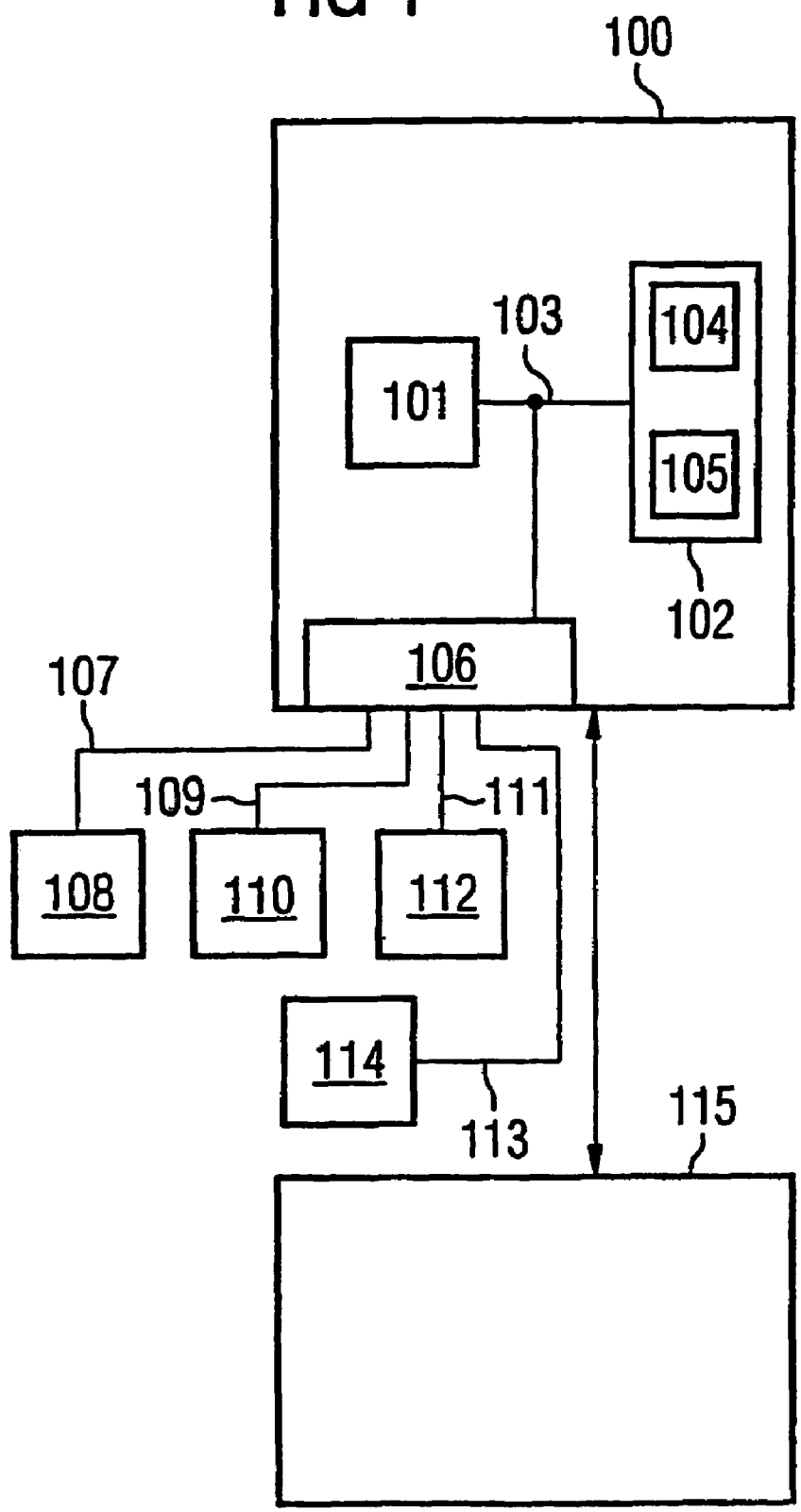
FIG. 1 is a configuration with a processor and a memory for the purposes of carrying out the method.

In the exemplary embodiments described in the following, an electrical circuit is described as the technical system 115. In this case, a net list 105 is stored in the memory 102, which describes the individual elements of the electrical circuit and also the links between them and the information flow direction, i.e. information on how electrical signals are propagated within the electrical circuit.

Furthermore, the computer includes an input/output interface 106 which is also connected via the bus 103 both to the memory 102 and also to the processor 101.

The input/output interface 106 is connected via a first link 107 to an external storage medium 108, for example a CD-ROM or a floppy disk drive. Via a second link 109, the computer 100 is connected to a keyboard 110. Via a third link 111, the computer 100 is connected to a computer mouse 112.

A fourth link 113 connects a display screen 114 to the input/output interface 106.

Figure 2:
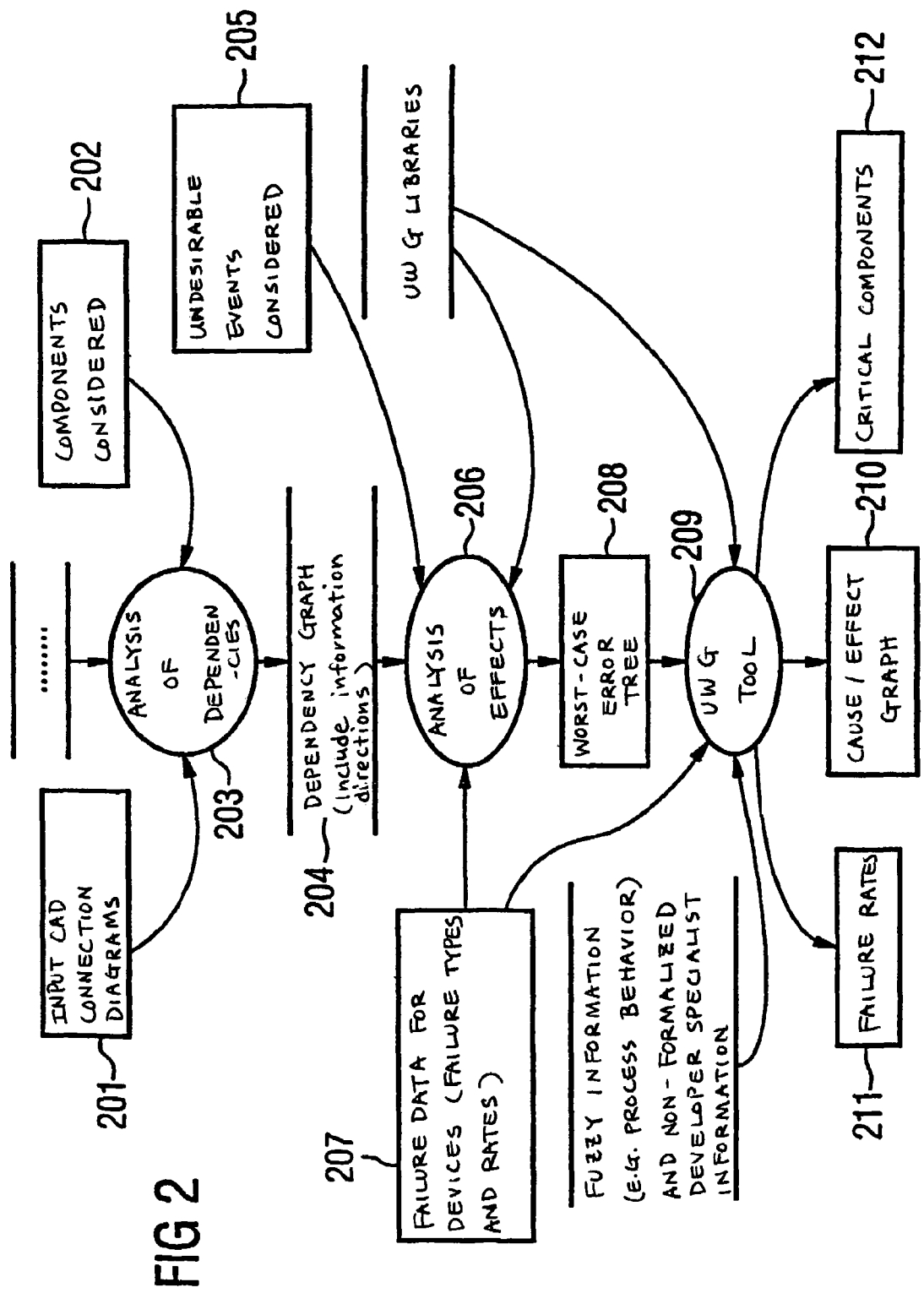
FIG. 2 is a flowchart in which individual steps of the method are represented according to the exemplary embodiments.

FIG. 2 shows a sketch which represents the basic procedure according to the exemplary embodiments described in the following. In a first step (Step 201), a CAD circuit diagram of an electrical circuit to be investigated is input into the memory 102 of the computer 100. The circuit diagram is present in an electronic form which can be processed by the computer 100, and in the exemplary embodiments in the form of a net list of the circuit structure description language EDIF. The net lists contain information on the electrical devices contained in the electrical circuit, designated in the following as elements of the electrical circuit, and also the links between them and information on the propagation of information within the electrical circuit, i.e. the propagation of electrical signals within the circuit.

Furthermore, predefined error trees of predefined elements 202 of an electrical circuit are stored in the memory 102. Error trees for various electrical circuit components (devices) are described in detail in the following. Each error tree is associated with a reference element of an electrical circuit.

Possible errors of the respective reference element are described by the error description, as is explained in further detail in the following. Failure data 207, i.e. failure probabilities, are respectively also associated with individual elements, by which the error probability of the respected reference element is described.

Furthermore, predefined group error trees of predefined element groups of elements 202 of an electrical circuit are stored in the memory 102. Group error trees of various electrical circuit components (devices) are described in detail in the following. Each group error tree is associated with all reference elements of a reference element group of an electrical circuit. Possible errors of the respective reference elements of a reference element group are described by the group error description, as is explained in further detail in the following. Group failure data, i.e. failure probabilities, are respectively also associated with individual element groups, by which the error probability of a reference element of a respective reference element group is described.

The grouping of the elements into element groups and therefore the grouping of reference elements into reference element groups is effected according to this exemplary embodiment in such a manner that elements of the same type implemented together on one chip, but with which different terminals are associated, are grouped into one reference element group. Since the elements are present in a net list, the net list is therefore analyzed with a view to identical device designations and the elements of the same type are respectively grouped into an element group for which a reference element group is formed.

In a further step (Step 203), the dependencies of the individual elements are determined with a view to possible errors occurring within the electrical circuit, and also the dependencies of individual elements of an element group with a view to possible errors occurring within the electrical circuit, for example with a view to errors possibly occurring on a chip on which the elements of an element group are implemented, and a dependency graph (204) is defined.

In one step (Step 205), an undesirable event is predefined by a user for the purposes of determining a full error tree.

For the purposes of determining the full error tree for the respective undesirable event considered, the effects of possible errors of the elements are analyzed for the electrical circuit, in an analysis step (Step 206), on the basis of predefined error probabilities of the individual elements in relation to different error types with regard to the predefined undesirable event considered. In the process, the group error descriptions of the elements of the element groups taken into account are also taken into account.

The result of the analysis step 206 is the full error tree 208.

In a further step (Step 209), the error tree for a simplified error tree 210, which is designated as a cause/effect graph in the following, is mapped.

Furthermore, an incidence probability 211 of the undesirable event considered is determined.

Furthermore, taking account of the individual error data of the elements for the electrical circuit, particularly critical elements 212 are determined which display a particular risk for the undesirable event considered.

As represented in FIG. 3, an element error description is determined for each element taken into consideration, using a stored error description which is respectively associated with a reference element, in a first step (Step 301). Possible errors of a respective reference element are described by an error description of the reference element (Block 302).

Furthermore, in a further step (Step 303), at least one part of the reference elements is grouped into reference element groups (Step 303) according to a predefined grouping criterion using a stored group error description which is respectively associated with a reference element group.

Possible errors of the reference elements of a reference element group, which preferably have an effect on several or all reference elements of the respective reference element group, are described by the group error description of a reference element group (Block 304).

A full error description in relation to the predefined undesirable event 205 considered is determined from the element error descriptions and the group error descriptions, taking into account information on element links (Step 305).

A first exemplary embodiment is described in the following, where the error description of a reference element is stored in the form of an error tree for the respective reference element.

In the case of the method according to the first exemplary embodiment, the linking of the individual elements of the electrical circuit is used as the basis for the generation of the full error tree relating to the respectively predefined undesirable event 205 considered.

FIG. 4 shows a simple electrical circuit 400. The electrical circuit 400 displays an AND gate 401 and also a first resistor $R_1$, a second resistor $R_2$ and also an npn bipolar transistor $T_1$. The AND gate 401 displays two inputs 402 and 403, to which input signals $In_1$ and $In_2$ can be applied. Furthermore, the AND gate 401 is connected to a ground terminal 404 and a further terminal 405. The further terminal 405 displays an electrical potential of 5 Volts. An output 406 of the AND gate 401 is connected to the second resistor $R_2$. The second resistor $R_2$ is connected via a second terminal 407 to the base terminal of the transistor $T_1$. The emitter terminal of the transistor $T_1$ is connected to the ground terminal 404. The collector terminal 408 is connected to the first resistor $R_1$, which in turn is connected to the first terminal 405. An output 409 of the electrical circuit 400, at which an output signal $Out_1$ can be sampled, is also connected to the collector terminal 408.

One error tree respectively for an erroneous output signal of the respective reference element is described in the following for various reference elements of the electrical circuit 400, respectively for an erroneous High level (erroneous electrical potential of 5 Volts, "H") and an erroneous Low level (erroneous electrical potential of 0 Volts, "L") which exists at an output of the respectively considered reference element. The respective error trees are stored in the memory 102 of the computer 100.

Reference Element: Electrical Resistor

FIG. 5a and FIG. 5b show two error trees 500 and 510 which describe, for an electrical resistor, the causes of an erroneous signal level at the output of the resistor.

FIG. 5a represents the error tree 500 for an electrical resistor in the case of an assumed erroneous High level (H) at the output of the electrical resistor 501. An erroneous High level is caused if the input signal at the resistor erroneously displays a High level 503 or if the electrical resistor is firstly short-circuited and the input of the electrical resistor displays a High level. The result for the error tree is therefore the representation that the erroneous High level at the output 501 can be described by the INCLUSIVE-OR operation 502 of the event that the input of the resistor erroneously displays a High level 503 together with a logic event 504. The caused logic event 504 is formed by an AND operation 505 of the events that the electrical resistor is short-circuited 506 and the input of the electrical resistor displays a High level 507.

FIG. 5b describes a second error tree 510 for a further predefined undesirable event, specifically an erroneous Low level (L) which exists at the output of the electrical resistor 511.

Such an undesirable, erroneous event occurs in the case of an INCLUSIVE-OR operation 517 of a first event 512, specifically that the input of the electrical resistor erroneously displays a Low level, together with a second logic event 513, which results due to an AND operation 514 from the events that the electrical resistor is short-circuited 515 and that a Low level exists 516 at the input of the electrical resistor.

Reference Element: Transistor in Emitter Connection

FIG. 6a and FIG. 6b show two error trees 600 and 610 for an npn bipolar transistor in emitter connection. A first error tree 600 describes the possible events which result in an erroneous High level at the output of the transistor 601.

The erroneous High level at the output of the transistor (601) occurs in the case of an INCLUSIVE-OR operation 602 of the following events:
- a High level exists 603 erroneously at the emitter terminal of the transistor;
- a Low level exists 604 erroneously at the base terminal of the transistor;
- the transistor itself is broken, e.g. blown 605;
- the collector resistor of the transistor is short-circuited 606.

The second error tree 610 for the npn bipolar transistor shows possible causes of an erroneous Low level at the output of the transistor 611.

The erroneous Low level at the output is described completely by an INCLUSIVE-OR operation 612 of the following events:
- the base terminal of the transistor erroneously displays a High level 613;
- the transistor itself is short-circuited 614;
- the collector resistor of the transistor is blown 615;
- the collector resistor of the transistor erroneously displays a Low level 616.

Reference Element: Electrical Capacitor

FIG. 7a and FIG. 7b show a first error tree 700 (cf. FIG. 7a) and a second error tree 710 (cf. FIG. 7b) for an electrical capacitor as the reference element of an electrical circuit.

The error trees have the same structure as the error trees 500 and 510 for an electrical resistor.

FIG. 7a represents the error tree 700 for an electrical capacitor in the case of an assumed erroneous High level (H) at the output of the electrical capacitor 701. An erroneous High level is caused if the input signal at the capacitor erroneously displays a High level 703 or if the electrical capacitor is firstly short-circuited and the input of the electrical capacitor displays a High level. The result for the error tree is therefore the representation that the erroneous High level at the output 701 can be described by the INCLUSIVE-OR operation 702 of the event that the input of the resistor erroneously displays a High level 703 together with a logic event 704. The logic event 704 is formed by an AND operation 705 of the events that the electrical capacitor is short-circuited 706 and the input of the electrical capacitor displays a High level 707.

FIG. 7b describes a second error tree 710 for a further predefined undesirable event, specifically an erroneous Low level (L) which exists at the output of the electrical capacitor 711.

Such an undesirable, erroneous event occurs in the case of an INCLUSIVE-OR operation 717 of a first event 712, specifically that the input of the electrical resistor erroneously displays a Low level, together with a second logic event 713, which results due to an AND operation 714 from the events that the electrical capacitor is short-circuited 715 and that a Low level exists 716 at the input of the electrical capacitor.

Reference Element: Electrical Coil

Figure 8A:
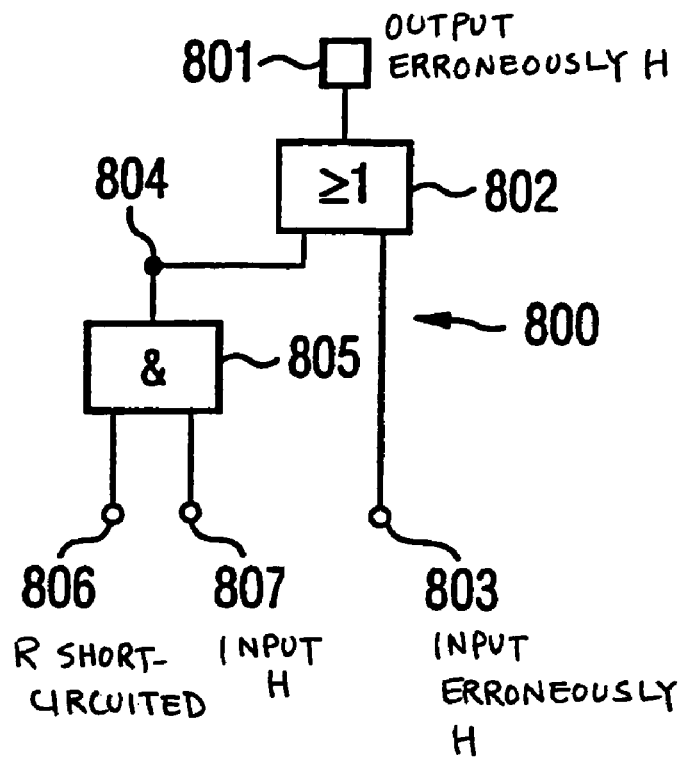
FIGS. 8a and 8b are a representation of two error trees for an electrical coil.
Figure 8B:
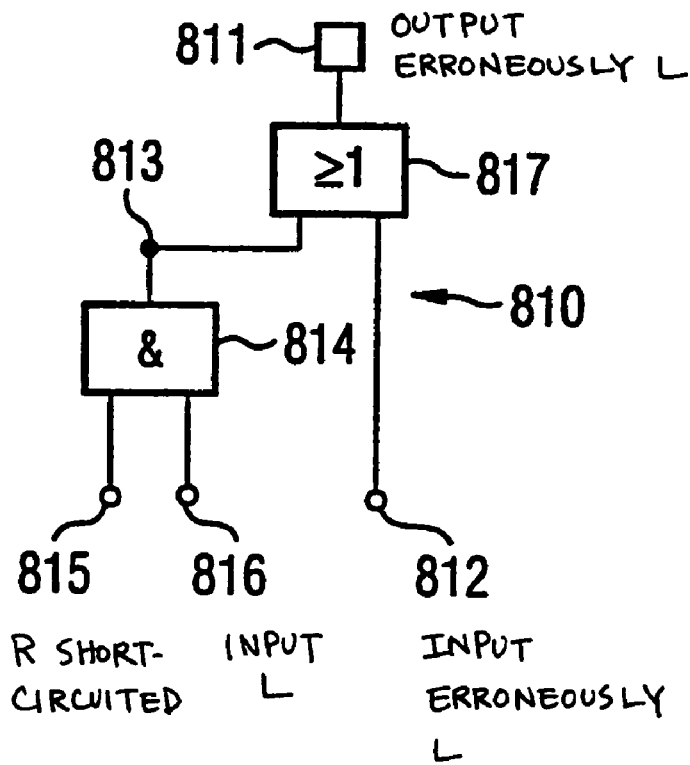

FIG. 8a and FIG. 8b show a first error tree 800 (cf. FIG. 8a) and also a second error tree 810 (cf. FIG. 8b) for an electrical coil.

The error trees have the same structure as the error trees 500 and 510 for an electrical resistor.

FIG. 8a represents the error tree 800 for an electrical capacitor in the case of an assumed erroneous High level (H) at the output of the electrical coil 801. An erroneous High level is caused if the input signal at the coil erroneously displays a High level 803 or if the electrical coil is firstly short-circuited and the input of the electrical coil displays a High level. The result for the error tree is therefore the representation that the erroneous High level at the output 801 can be described by the INCLUSIVE-OR operation 802 of the event that the input of the resistor erroneously displays a High level 803 together with a logic event 804. The logic event 804 is formed by an AND operation 805 of the events that the electrical coil is short-circuited 806 and the input of the electrical coil displays a High level 807.

FIG. 8b describes a second error tree 810 for a further predefined undesirable event, specifically an erroneous Low level (L) which exists at the output of the electrical coil 811.

Such an undesirable, erroneous event occurs in the case of an INCLUSIVE-OR operation 817 of a first event 812, specifically that the input of the electrical coil erroneously displays a Low level, together with a second logic event 813, which results due to an AND operation 814 from the events that the electrical coil is short-circuited 815 and that a Low level exists 816 at the input of the electrical coil.

Reference Element: General Block with n Inputs and One Output

FIG. 9a and FIG. 9b show a first error tree 900 (cf. FIG. 9a) and a second error tree 910 (cf. FIG. 9b) for a block with any internal behavior, which is described solely by the behavior at the terminals of the block. The block displays n (n=1 ... ∞) terminals.

An erroneous High level at the output of the block 901 occurs in the case of an INCLUSIVE-OR operation 902 of the following events (cf. first error tree 900):
  a first input of the block displays an erroneous level 903;
  a second input of the block displays an erroneous level 904;
  etc.;
  input n of the block displays an erroneous level 905;
  the block itself displays erroneous behavior, i.e. a failure exists inside the block 906;
  the supply voltage applied to the block is erroneous 907.

An erroneous Low level at the output 911 is caused by the following INCLUSIVE-OR operation 912 of the following events, which are represented in the second error tree 910:
  a first input is erroneous 913;
  a second input is erroneous 914;
  etc.;
  input n is erroneous 915;
  a failure occurs inside the block 916;
  the supply voltage is erroneous 917.

Reference Element: AND Gate

Figure 10A:
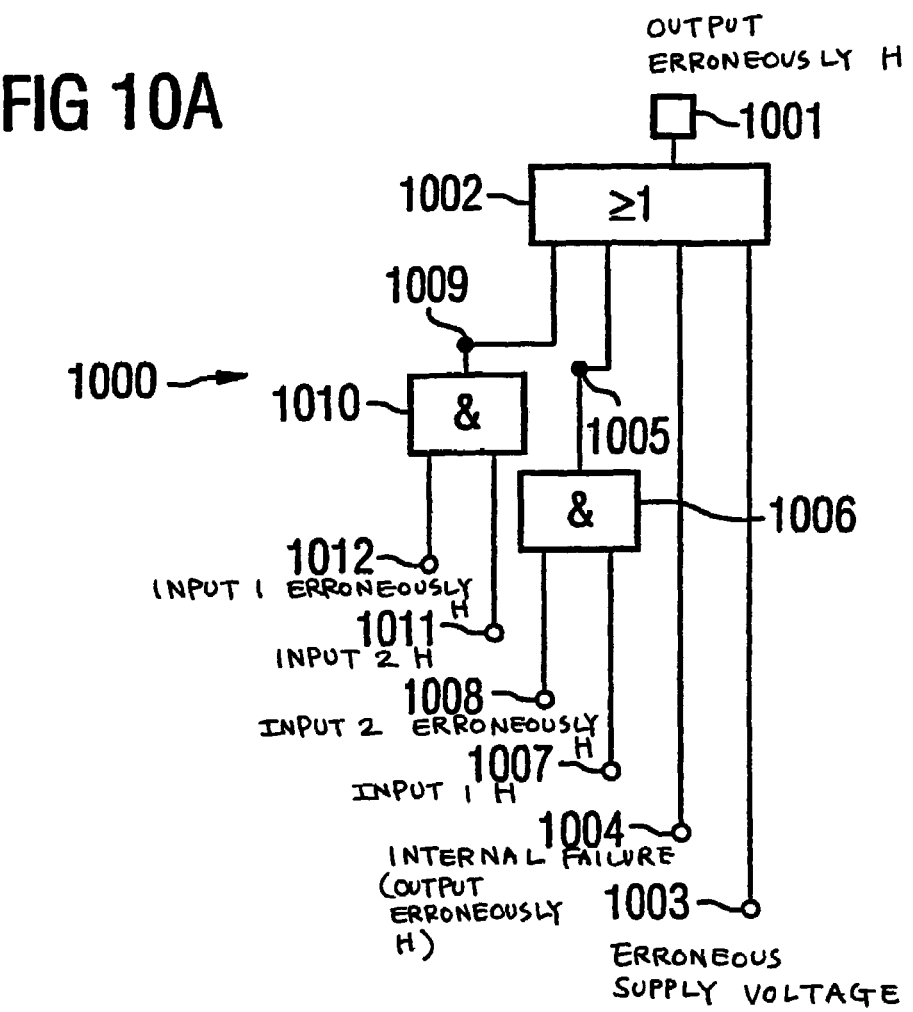
FIGS. 10a and 10b are a representation of two element error trees for an AND gate.
Figure 10B:
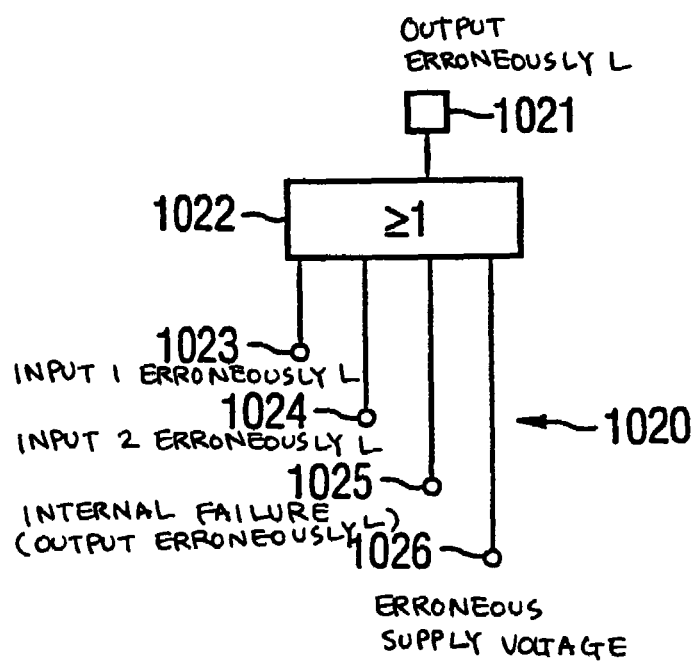

FIG. 10a and FIG. 10b show a first error tree 1000 (cf. FIG. 10a) and also a second error tree 1020 (cf. FIG. 10b) for an AND gate.

The first error tree 1000 describes the events which result in an erroneous High level at the output of the AND gate 1001.

Such an erroneous High level at the output 1001 results in the case of an INCLUSIVE-OR operation 1002 of the following events:
  an erroneous supply voltage 1003;
  an internal failure of the AND gate (the output of the AND gate erroneously displays a High level) 1004;
  a first interim event 1005 which results from a first AND operation 1006 of the events that the first input of the AND gate displays a High level 1007 and the second input of the AND gate erroneously displays a High level 1008;
  a second interim event 1009 which results from an AND operation 1010 of the events that the second input displays a High level 1011 and that the first input erroneously displays a High level 1012.

The second error tree 1020 describes the causes which result in an erroneous Low level at the output of the AND gate 1021.

An erroneous Low level at the output of the AND gate results due to an INCLUSIVE-OR operation 1022 of the following events:
  the first input erroneously displays a Low level 1023;
  the second input of the AND gate erroneously displays a Low level 1024;
  the AND gate itself is broken, i.e. the output of the AND gate erroneously displays a Low level 1025;
  the supply voltage is erroneous 1026.

Figure 15:
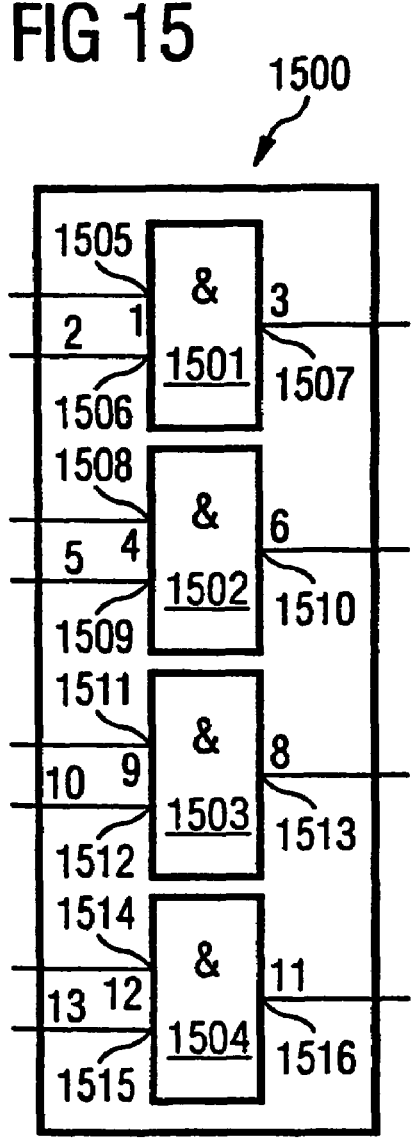
FIG. 15 is a sketch of four NAND gates which are implemented together on one chip.

FIG. 15 shows four NAND gates 1501, 1502, 1503 and 1504 which are implemented together on one chip 1500, for example the chip 74VHC00. The first NAND gate 1501 displays a first input terminal 1505, a second input terminal 1506 and a first output terminal 1507. The second NAND gate 1502 displays a third input terminal 1508, a fourth input terminal 1509 and a second output terminal 1510. The third NAND gate 1503 displays a fifth input terminal 1511, a sixth input terminal 1512 and a third output terminal 1513. The fourth NAND gate 1504 displays a seventh input terminal 1514, an eighth input terminal 1515 and a fourth output terminal 1516.

The individual NAND gates 1501, 1502, 1503 and 1504 are grouped into a group according to this exemplary embodiment and a group error tree is compiled which describes the possible error relationships which exist in the case of the occurrence of an error on the chip 1500.

The group error tree is stored and integrated into the full error tree if one of the NAND gates 1501, 1502, 1503 and 1504 is taken into account in the full error description.

Figure 16:
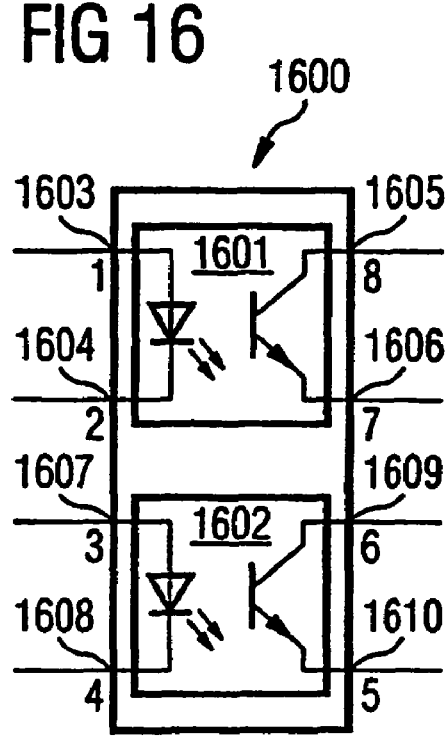
FIG. 16 is a sketch of two optocoupler circuits which are implemented together on one chip.

FIG. 16 shows an electrical circuit with a first optocoupler 1601 and a second optocoupler 1602 which are also both integrated on one chip 1600, the chip ILDF217 according to this exemplary embodiment.

The first optocoupler 1601 displays a first input terminal 1603 and a second input terminal 1604 and also a first output terminal 1605 and a second output terminal 1606. The second optocoupler 1602 displays a third input terminal 1607 and a fourth input terminal 1608 and also a third output terminal 1609 and a fourth output terminal 1610.

The individual optocouplers 1601 and 1602 are grouped into a group according to this exemplary embodiment and a group error tree is compiled which describes the possible error relationships which exist in the case of the occurrence of an error on the chip 1600.

The group error tree is stored and integrated into the full error tree if one of the optocouplers 1601 and 1602 is taken into account in the full error description.

FIG. 17A shows, for the purposes of further elucidation, a first optocoupler circuit 1701 and a second optocoupler circuit 1702 which are both implemented on the optocoupler chip 1600 according to FIG. 16 but are considered as mutually independent circuit components.

The first optocoupler circuit 1701 displays a first electrical resistor 1703 which is connected to the first input terminal 1603. A first voltage divider is connected to the second output terminal 1606 together with a second electrical resistor 1704 and a third electrical resistor 1705.

The second optocoupler circuit 1702 displays a fourth electrical resistor 1706 which is connected to the third input terminal 1607. A second voltage divider is connected to the fourth output terminal 1610 together with a fifth electrical resistor 1707 and a sixth electrical resistor 1708.

Figure 18A:
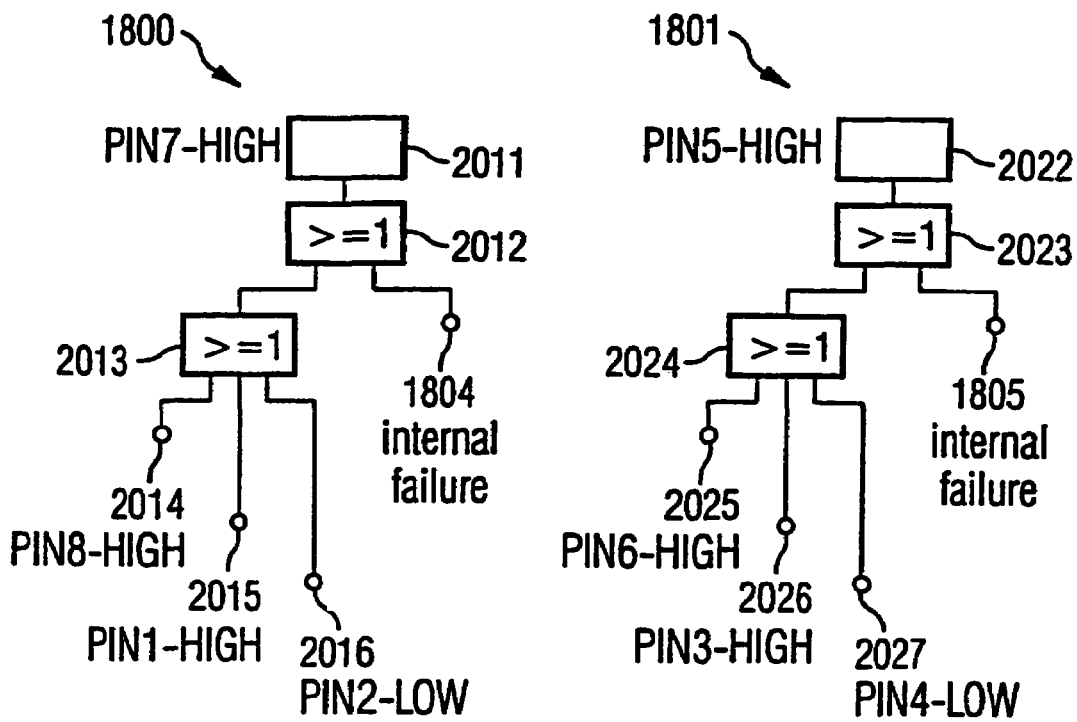
FIGS. 18A and 18B are a representation of a full error tree for the circuit configuration in FIG. 17A (FIG. 18A) and a representation of a full error tree for the circuit configuration in FIG. 17B (FIG. 18B)

FIG. 18a represents a first error tree 1800 for the first optocoupler circuit 1701 in FIG. 17A in the case of an assumed erroneous High level (H) at the second output terminal 1606 and also a second error tree 1801 for the second optocoupler circuit 1702 in the case of an assumed erroneous High level (H) at the fourth output terminal 1610. The first and second error trees describe the errors in the case of input signals and signal forms considered on a mutually independent, i.e. not correlated, basis.

An erroneous High level at the second output terminal 1606 is caused if an internal error has occurred in the first optocoupler 1601 or an erroneous level exists at a minimum of one of the following terminals:
  an erroneous High level at the first output terminal 1605,
  an erroneous High level at the first input terminal 1603,
  an erroneous Low level at the second input terminal 1604.

An erroneous High level at the fourth output terminal 1610 is caused if an internal error has occurred in the second optocoupler 1602 or an erroneous level exists at a minimum of one of the following terminals:
  an erroneous High level at the third output terminal 1609,
  an erroneous High level at the third input terminal 1607,
  an erroneous Low level at the fourth input terminal 1608.

FIG. 17B shows, for the purposes of elucidation, the optocoupler circuits 1701 and 1702 in FIG. 17A, where the two optocouplers 1601 and 1602 are grouped into an optocoupler group 1709, since the two optocouplers 1601 and 1602 are integrated together on one chip and therefore an error in the chip can have effects on both optocouplers 1601 and 1602.

Figure 18B:
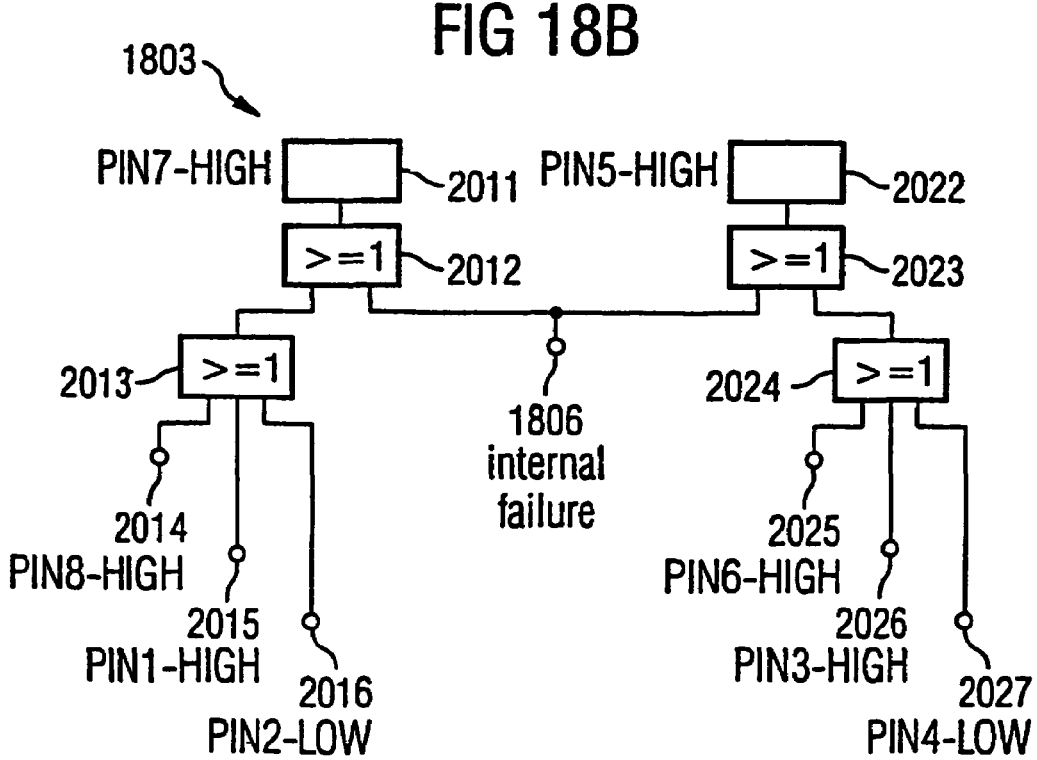

FIG. 18B correspondingly shows the group error tree for the optocoupler group 1709 according to FIG. 17B.

The group error tree 1803 essentially displays the components of the first error tree 1801 and the second error tree 1802 with the difference that the error scenario that the error scenarios "internal error in the first optocoupler 1601" 1804 and "internal error in the second optocoupler 1602" 1805 are combined into a group error scenario "internal error in the optocoupler chip 1600" 1806.

Consequently, a further error hierarchy level is clearly introduced which allows a more improved error analysis.

This procedure is carried out correspondingly transferred to the formula-based error description as elucidated in detail in the following.

For the purposes of determining the full error description of the electrical circuit, a user defines an undesirable event to be considered at a terminal defined by the user. It is assumed in the following that an erroneous High level at the output 409 of the electrical circuit 400 is defined as the undesirable event, i.e. the output signal $Out_1$ should display a level of 5 Volt (High level).

The net list which describes the configuration according to FIG. 4 is investigated by a suitable parser for the elements contained in the circuit. A check is carried out in a further step as to whether the corresponding elements are already stored as reference elements in the memory 102.

It is assumed in the following that this is the case for all elements which are contained in the circuit represented in FIG. 4.

Then the corresponding error tree for the considered element or reference element is determined respectively in a search directed backward from the output 409 and added as an element error tree to the full error tree. A successive progression from the output 409 of the electrical circuit 400 to the inputs 402 and 403 of the electrical circuit 400 therefore allows a module-like compilation of the full error tree which results, on the basis of the automatic procedure by the computer, in a demonstrably complete full error tree. This ultimately ensures a reliable description of all possible errors within the electrical circuit which result in the predefined undesirable event.

A full error tree resulting according to the above description for the circuit represented in FIG. 4 is represented in FIG. 11. The progression described above is elucidated once again in detail on the basis of this representation.

The undesirable event 1101 is defined by the user as an erroneous High level of the output signal $Out_1$.

The erroneous High level results on the basis of an INCLUSIVE-OR operation 1102 of an erroneous High level which is caused by the first electrical resistor $R_1$ or by an erroneous High level which exists at the output of the transistor $T_1$. On the basis of the stored error trees for the reference elements of electrical resistor and npn bipolar transistor in emitter connection, the result, subject to the precondition that the input of the first electrical resistor $R_1$ is at High level, is that an erroneous High level can only occur at the output of the first electrical resistor $R_1$ if the first electrical resistor $R_1$ is short-circuited 1103.

Determination of the element error tree for the transistor $T_1$ from the first error tree 600 of the npn bipolar transistor in emitter connection results in the fact that the output signal $Out_1$ erroneously displays a High level if the collector resistor of the transistor $T_1$ is short-circuited 1104 or the transistor $T_1$ is blown 1105 or the emitter terminal of the transistor $T_1$ erroneously displays a High level 1106. A further cause of an erroneous output signal $Out_1$ with a High level is that the base terminal of the transistor erroneously displays a Low level 1107.

The structural information contained in the net list then results in the fact that an erroneously Low level at the base terminal of the transistor $T_1$ results on the basis of an INCLUSIVE-OR operation 1108 which results on the basis of the second error tree 510 for an electrical resistor, mapped to the second electrical resistor $R_2$ in the electrical circuit 400.

The erroneous Low level at the output 407 of the second electrical resistor $R_2$ occurs if the second terminal 406, as the input of the second electrical resistor $R_2$, erroneously displays a Low level 1109 or in the case of the presence of an AND operation 1110 of the following events:

the second electrical resistor $R_2$ is short-circuited 1111;
the second terminal 406 displays, as the input of the second electrical resistor $R_2$, a Low level 1112.

The net list furthermore indicates that the second terminal 406 is simultaneously also the output of the AND gate 401 of the electrical circuit 400. An erroneous Low level at the input of the second electrical resistor $R_2$ is therefore dependent on the second error tree 1020 of an AND gate, in this case the AND gate 401 of the electrical circuit 400.

The result is therefore that an erroneous Low level at the input of the second electrical resistor $R_2$ results due to an INCLUSIVE-OR operation 1113 of the following events:

the first input signal $In_1$ is erroneous 1114;
the second input signal $In_2$ is erroneous 1115;
the AND gate 401 itself is broken 1116;
the supply voltage for the AND gate 401 is erroneous 1117.

Taking direct account of the second error tree for 1020 for an AND gate results in the refined full error tree 1200 represented in FIG. 12 for the electrical circuit 40 with regard to an erroneous High level at the output 409 of the electrical circuit 400.

In the refined error tree, the coinciding elements and events in FIG. 11 and FIG. 12 are labeled with the same reference symbols.

The refined representation results in the fact that the erroneous Low level at the input of the second electrical resistor $R_2$ 109 results due to an INCLUSIVE-OR operation 1113 of the following events:

the supply voltage of the AND gate 401 is erroneous 1117;
the output of the AND gate erroneously displays a Low level 1201;
a first transistor interim signal 1203 resulting on the basis of a first transistor AND OPERATION 1202 displays a High level if the first input signal $In_1$ displays a Low level 1204 and the second input signal $In_2$ erroneously displays a Low level 1205;
a second transistor interim signal 1207 resulting on the basis of a second transistor AND operation 1206 displays a High level if the first input signal $In_1$ erroneously displays a Low level 1208 and the second input signal $In_2$ displays a Low level 1209.

The full error tree 1200 for the electrical circuit is therefore determined in relation to an erroneous output signal $Out_1$ at High level.

If an element of a reference element group is contained in the respective circuit, the respective group error tree is employed correspondingly in the generation of the full error tree.

The error tree is stored in the memory 102 of the computer and represented for the user on the display screen 114 on request.

Figure 19:
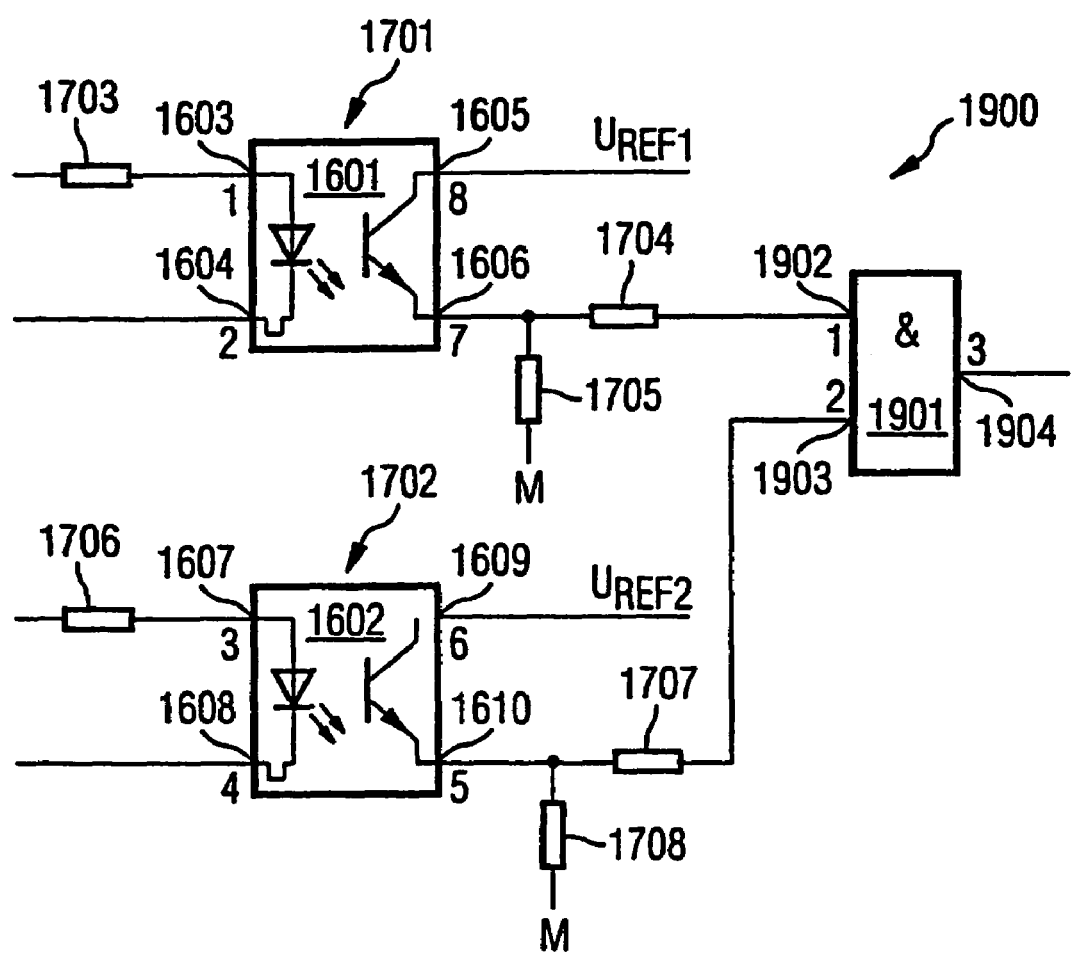
FIG. 19 is a circuit configuration with the two optocouplers according to FIG. 17A and FIGS. 17A and 17B and an AND gate respectively connected to the respective voltage divider.

FIG. 19 shows a further circuit configuration 1900 which displays the two optocoupler circuits 1701 and 1702 and also an AND gate 1901. A first input terminal 1902 of the AND gate 1901 is coupled to the second electrical resistor 1704 and a second input terminal 1903 to the fifth electrical resistor 1707. An output signal of the further circuit configuration 1900 exists at an output terminal 1904 of the AND gate 1901.

Figure 20A:
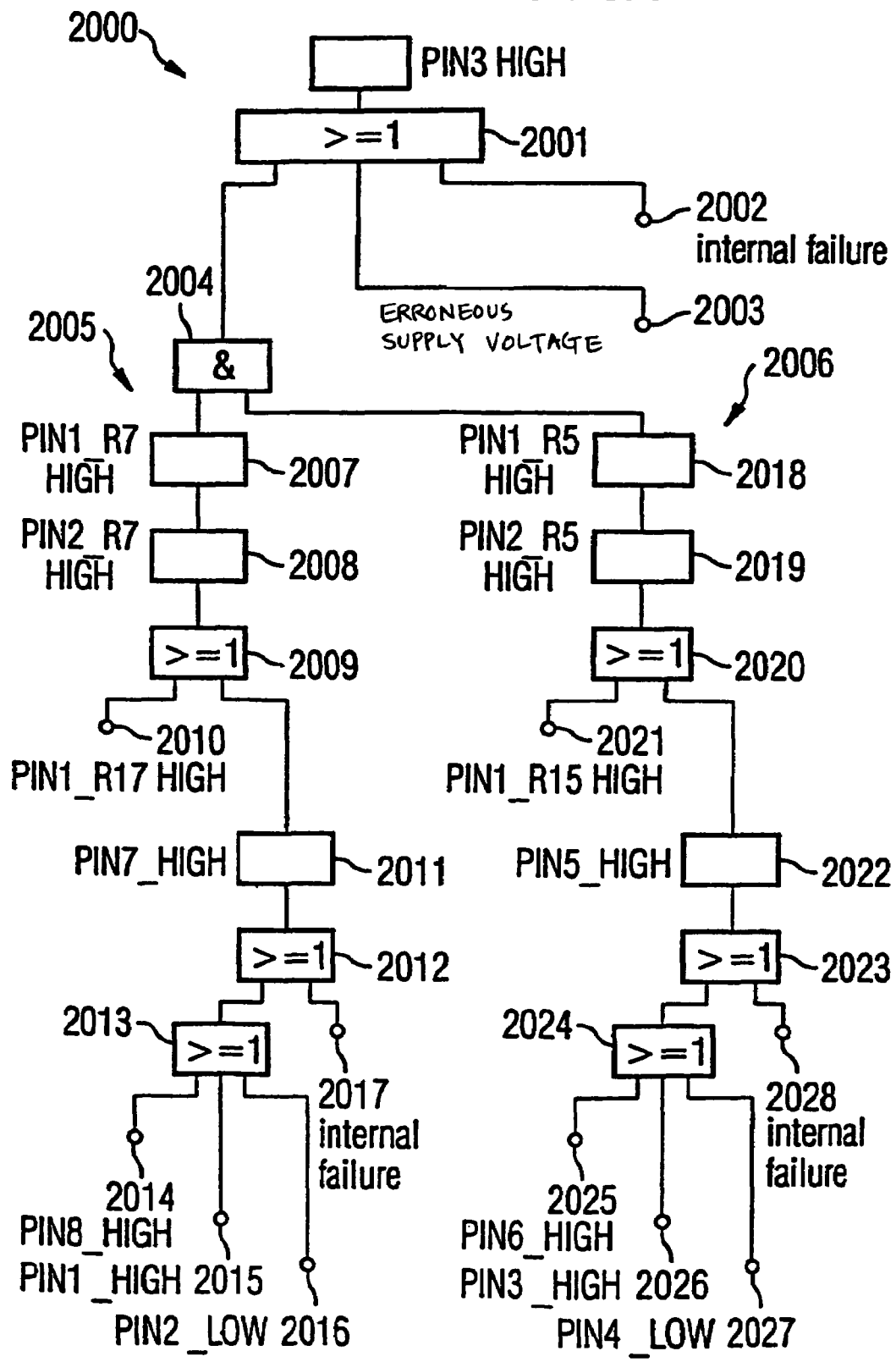
FIGS. 20A and 20B are a representation of a full error tree of the circuit configuration in FIG. 19 for the eventuality that no group error tree is taken into account (FIG. 20A) and for the eventuality that the group error tree according to FIG. 18B is inserted for the two optocouplers.

FIG. 20A shows a first full error tree 2000 for the further circuit configuration 1900 represented in FIG. 19 for the eventuality that only the individual reference elements and the associated error descriptions are taken into account.

The first full error tree 2000 results in the fact that the erroneous High level at the output terminal 1904 of the AND gate 1901 results due to an INCLUSIVE-OR operation 2001 of the following events:
  the AND gate itself is erroneous, 2002;
  the supply voltage is erroneous, 2003;
  of a logical AND operation 2004 of a first event combination 2005 with a second event combination 2006.

The first event combination is an AND operation of the following events:
  a first terminal of the second electrical resistor 1704, to which the first input terminal 1902 of the AND gate 1901 is connected, is at High level 2007;
  a second terminal of the second electrical resistor 1704, to which the second output terminal 1606 of the first optocoupler 1601 is connected, is at High level 2008;
  an INCLUSIVE-OR operation 2009 of the following events:
  a first terminal of the third electrical resistor 1705 is at High level 2010;
  the second output terminal 1606 of the first optocoupler 1601 is at High level 2011 AND a second INCLUSIVE-OR operation 2012 is fulfilled.

The second INCLUSIVE-OR operation 2012 is fulfilled if either a third INCLUSIVE-OR operation 2013 of the following events is fulfilled:
  the first output terminal 1605 of the first optocoupler 1601 is at High level 2014;
  the first input terminal 1603 of the first optocoupler 1601 is at High level 2015;
  the second input terminal 1604 of the first optocoupler 1601 is at Low level 2016;
  or
  if the first optocoupler 1601 is erroneous, 2017.

The second event combination 2006 is an AND operation of the following events:
  a first terminal of the fifth electrical resistor 1707, to which the second input terminal 1903 of the AND gate 1901 is connected, is at High level 2018;
  a second terminal of the fifth electrical resistor 1707, to which the fourth output terminal 1610 of the second optocoupler 1602 is connected, is at High level 2019;
  an INCLUSIVE-OR operation 2020 of the following events:
  a first terminal of the sixth electrical resistor 1708 is at High level 2021;
  the fourth output terminal 1610 of the second optocoupler 1602 is at High level 2022 AND a fourth INCLUSIVE-OR operation 2023 is fulfilled.

The fourth INCLUSIVE-OR operation 2023 is fulfilled if either a fifth INCLUSIVE-OR operation 2024 of the following events is fulfilled:
  the third output terminal 1609 of the second optocoupler 1602 is at High level 2025;
  the third input terminal 1607 of the second optocoupler 1602 is at High level 2026;
  the fourth input terminal 1608 of the second optocoupler 1602 is at Low level 2027;
  or
  if the second optocoupler 1602 is erroneous, 2028.

Figure 20B:
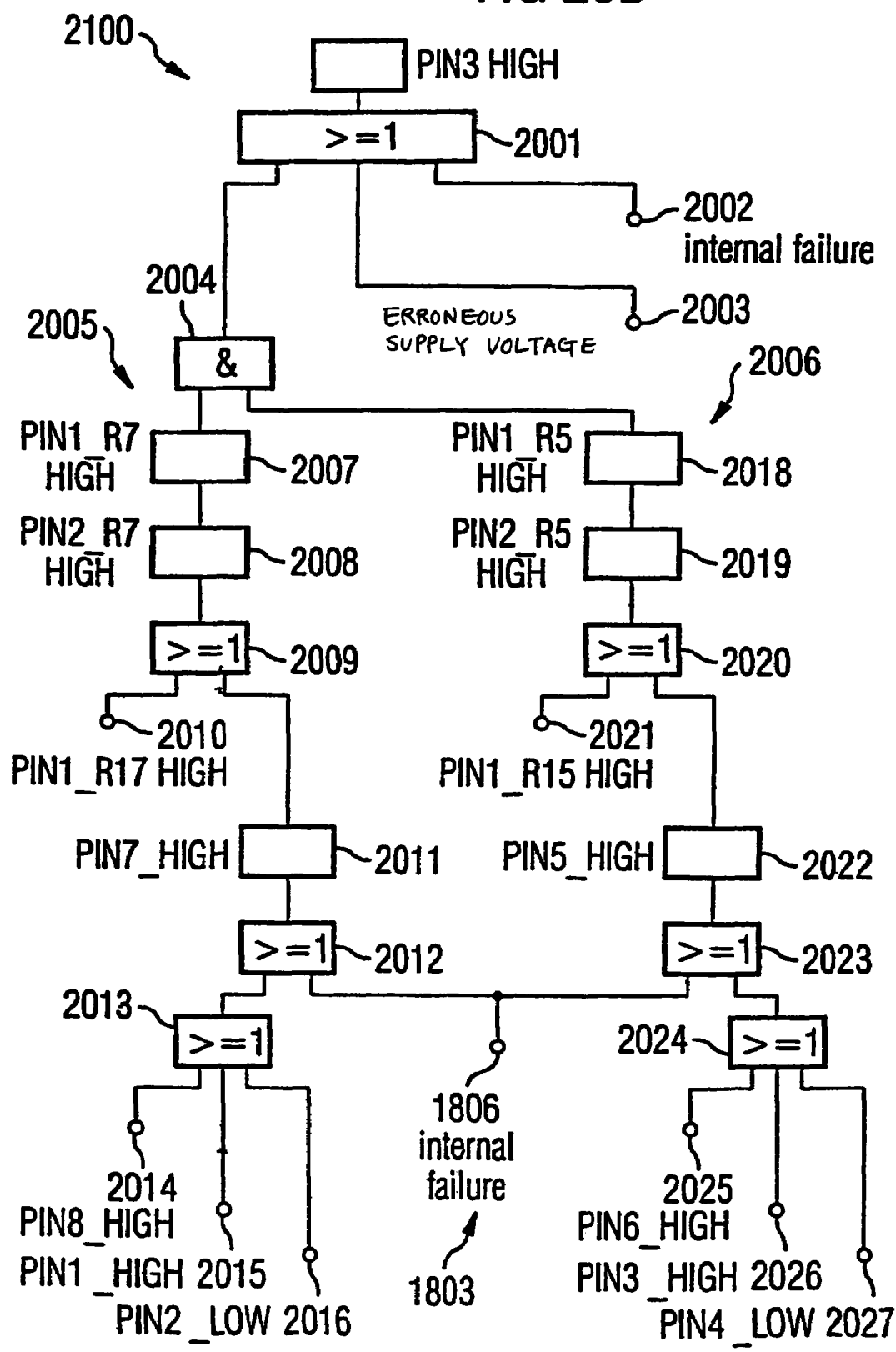

FIG. 20B shows a second full error tree 2100 for the further circuit configuration 1900 represented in FIG. 19 for the eventuality that the group error tree 1803 according to FIG. 18B is taken into account and inserted.

The second full error tree 2100 and the first full error tree 2000 are identical except for the difference that the two error scenarios listed separately in the first full error tree 2000, that the first optocoupler 1601 is erroneous, 2017 and that the second optocoupler 1602 is erroneous, 2028, are now combined into the group error scenario "internal error in the optocoupler chip 1600" 1806 according to the group error tree 1803.

Second Exemplary Embodiment

In the second exemplary embodiment, as an alternative to the procedure described above, the individual elements of the technical system 115, i.e. the electrical circuit 400 in the context of the exemplary embodiment, are represented as Boolean equations which describe the behavior of the individual element in the normal situation (error-free situation) and in the presence of errors.

The equation system formed is solved for the considered predefined undesirable event of the error tree. The solution is mapped to the full error tree.

Only "binary" failures and signal levels are considered in this example with the result that, for the individual elements of the electrical circuit described in FIG. 13, which correspond to the electrical circuit in FIG. 4, the error equations set out in the following result for the individual reference elements.

In FIG. 13, the elements coinciding with the circuit configuration in FIG. 4 are labeled with the same reference symbols.

Furthermore, the following elements are represented in FIG. 13:
  a first terminal $$R_1^{A1}$$

of the first electrical resistor $R_1$,
  a second terminal $$R_1^{A2}$$

of the first electrical resistor $R_1$,
  a base terminal $T_1^B$ of the transistor $T_1$,
  an emitter terminal $T_1^E$ of the transistor $T_1$,
  a collector terminal $T_1^K$ of the transistor $T_1$.

Reference Element: Electrical Resistor

The following equation results for an electrical resistor, which describes all possible states of the resistor, specifically the three states of an intact resistor, described as $R^{OK}$, a short-circuited resistor ($R^{short}$) and a blown resistor ($R^{open}$). The behavior of a resistor R with two terminals $R^{A1}$ and $R^{A2}$ is described by the following Boolean equation:

$$R^{short} \cdot (R^{A1} = R^{A2}) + R^{open} + R^{OK} = \text{TRUE} \qquad (1)$$

If the resistor is short-circuited ($R^{short}$), both terminals $R^{A_1}$ and $R^{A_2}$ possess an identical logical value. If the resistor is intact ($R^{OK}$) or blown ($R^{open}$), no statement can be made about the logical values of the terminals. They may be identical or different.

Reference Element: npn Bipolar Transistor

The behavior of an npn bipolar transistor with an emitter terminal ($T^E$), a base terminal ($T^B$) and a collector terminal ($T^K$) is described by the following Boolean equation:

$$[T^{short}+[T^{OK}\cdot(T^B=H)]]\cdot(T^E=T^C)+T^{open}+$$

$$+[T^{OK}\cdot(T^B=L)]=TRUE \quad (2)$$

If the transistor is intact ($T^{OK}$) and the base possesses the logical value H, i.e. that a High level exists at the base terminal $T^B$ or the transistor is short-circuited ($T^{short}$), the emitter terminal ($T^E$) and the collector terminal ($T^K$) possess identical logical values ($T^E=T^K$). If the transistor is blown ($T^{open}$) or intact ($T^{OK}$) and blocked ($T^B=L$), no statement can be made about the logical values at the emitter and at the collector terminal of the transistor.

Reference Element: Electrical Capacitor

The equation for an electrical capacitor corresponds to equation (1) for the electrical resistor.

Reference Element: Electrical Coil

The equation for an electrical coil corresponds to equation (1) for the electrical resistor.

Reference Element: AND Gate

These stored general error equations for the reference elements are mapped to the elements actually contained in the electrical circuit 400, thereby enabling an analysis of the electrical circuit 400 represented in FIG. 4 and FIG. 13. Those situations which cause a High level at the output 409 are again considered.

The solutions of the following equations are accordingly determined:

$$[R_1^{short}\cdot(R_1^{A_1}=R_1^{A_2})+R_1^{open}+ \quad (3)$$
$$R_1^{OK}]++[\![T_1^{short}+[T_1^{OK}\cdot(T_1^B=H)]]\!]\cdot(T_1^E=T_1^C)+$$
$$T_1^{open}+[T_1^{OK}\cdot(T_1^B=L)]]\!]=TRUE$$

The following subsidiary conditions apply in this respect:

$$R_1^{A_1}=H \quad (4)$$

$$R_1^{A_2}=T_1^C=Out_1=H \quad (5)$$

The solution is:

$$[R_1^{short}+R_1^{open}+R_1^{OK}]+[T_1^{open}+[T_1^{OK}\cdot(T_1^B=L)]] \quad (7)$$

Since it is ensured that the first electrical resistor $R_1$ is always in one of the states short-circuited, open or intact, equation (7) can be simplified as follows:

$$TRUE+T_1^{open}+[T_1^{OK}\cdot(T_1^B=L)] \quad (8)$$

This solution is converted directly into the error tree represented in FIG. 14a.

An error tree 1400 for a High level for the output signal Out₁ 1401 results due to an INCLUSIVE-OR operation 1402 of the events TRUE 1403 which results through an INCLUSIVE-OR operation 1404 of the following events:

the first electrical resistor $R_1$ is open 1405;

the first electrical resistor $R_1$ is short-circuited 1406;

the first electrical resistor $R_1$ is intact 1407.

A further event which results in a High level for the output signal Out₁ is the event that the transistor $T_1$ is blown 1408.

Furthermore, a High level for the output signal Out₁ results in the case of a first AND interim signal 1409, which results from an AND operation 1410 of the events that the transistor $T_1$ is intact 1411 and the base terminal $T_1^B$ displays a Low level 1412.

The cause of this pessimistic statement is the disjunction operation of the logical equations of the individual elements of the electrical circuit 400. Thus, an electrical resistor can possess identical logical values at its two terminals in each state. If it is short-circuited, it is ensured that the values at the terminals are identical. If it is blown or intact, the state of the surrounding elements of the electrical circuit dictates the logical values. In view of the disjunction operation of the logical equations, restrictions due to other elements of the electrical circuit 400 are not considered in order to prevent possible causes being wrongly suppressed. In the present circuit, this would occur for the situation where both the first electrical resistor $R_1$ and also the transistor $T_1$ are short-circuited. The output signal Out₁ can display both a High level and also a Low level. This would not be detected in the case of a conjunction operation, however, since the condition $$H=R_1^{A_1}=R_1^{A_2}=Out_1=T_1^K=T_1^E=L$$

gives the Boolean value wrongly and therefore drops out. A drawback is that, on the basis of the disjunction operation, an intact or blown first electrical resistor $R_1$ is also identified as a cause of a High level of the output signal Out₁. This is only correct, however, if the transistor $T_1$ is blown or driven high. Both these causes are already contained in the solution, however, with the result that the following term is obtained as the correct solution:

$$R_1^{short}+T_1^{open}+[T_1^{OK}\cdot(T_1^B=L)] \quad (9)$$

The solution $$TRUE+T_1^{open}+[T_1^{OK}\cdot(T_1^B=L)]$$

contains the solution according to the requirement (9).

It is guaranteed that this is always fulfilled in the case of a disjunction operation of the logical equations. The fuzziness which is caused through not taking account of the interactions cannot result in an optimistic error tree in this case.

The evaluation of the electrical circuit 400 in relation to a Low level for the output signal Out₁ is effected analogously. The solutions of equation (3) which fulfill the following conditions are determined:

$$R_1^{A1} = H \quad (10)$$

$$R_1^{A2} = T_1^C = Out_1 = L \quad (11)$$

$$T_1^E = L \quad (12)$$

The solution is:

$$[R_1^{open} + R_1^{OK}] + \begin{bmatrix} [T_1^{short} + [T_1^{OK} \cdot (T_1^B = H)]] + T_1^{open} + \\ [T_1^{OK} \cdot (T_1^B = L)] \end{bmatrix} \quad (13)$$

This is identical to:

$$[R_1^{open} + R_1^{OK}] + [T_1^{short} + T_1^{OK} + T_1^{open}] \quad (14)$$

Since it is ensured that the transistor $T_1$ is always in one of the states short-circuited, open or intact, this can be simplified as follows:

$$R_1^{open} + R_1^{OK} + TRUE \quad (15)$$

The resultant error tree is represented in FIG. 14b. The resultant Low level of the output signal 1420 results due to an INCLUSIVE-OR operation 1421 of the events that the first electrical resistor is blown 1422, the first electrical resistor $R_1$ is intact 1423 and the event TRUE 1424 which is always fulfilled since it results from the INCLUSIVE-OR operation 1425 of the following events:

the transistor $T_1$ is open 1426;
the transistor $T_1$ is short-circuited 1427;
the transistor $T_1$ is intact 1428.

The description of the individual elements of the electrical circuit with independent equations results in some circumstances in an excessively pessimistic evaluation of the situation. Thus, for example, equation (1) for a resistor only describes a relationship between the logical values of the terminals if the resistor is short-circuited. In all other cases, all logical values are possible. This does not apply, however, in the context of a specific integration of a resistor into an electrical circuit.

Therefore it may be worthwhile not to describe individual elements but elementary circuit components by their logical equations. In the case of the emitter circuit according to FIG. 4 and/or FIG. 13, the following logical equation is obtained:

$$[R_1^{short} \cdot T_1^{short} + R_1^{open} \cdot T_1^{open}] + \quad (16)$$
$$[R_1^{short} \cdot (Out_1 = R_1^{A1})] + [T_1^{short} \cdot (Out_1 = T_1^E)] +$$
$$[T_1^{OK} \cdot (T_1^B = H) \cdot (R_1^{open} + R_1^{OK}) \cdot (Out_1 = T_1^E)] +$$
$$[T_1^{OK} \cdot R_1^{open} \cdot (T_1^B = L)] + [T_1^{open} \cdot R_1^{OK} \cdot (Out_1 = R_1^{A1})] +$$
$$[T_1^{OK} \cdot R_1^{OK} \cdot (T_1^B = L) \cdot (Out_1 = R_1^{A1})] = TRUE$$

The solution of equation (16) which fulfills the following conditions is now determined:

$$R_1^{A1} = H = Out_1 \quad (17)$$

$$T_1^E = L \quad (18)$$

The solution is:

$$[R_1^{short} \cdot T_1^{short} + R_1^{open} \cdot T_1^{open}] + [R_1^{short}] + \quad (19)$$
$$[T_1^{OK} \cdot R_1^{open} \cdot (T_1^B = L)] + [T_1^{open} \cdot R_1^{OK}] + [T_1^{OK} \cdot R_1^{OK} \cdot (T_1^B = L)]$$

This can be simplified to:

$$[T_1^{open}] + [R_1^{short}] + [T_1^{OK} \cdot (T_1^B = L)] \quad (20)$$

Figure 14C:
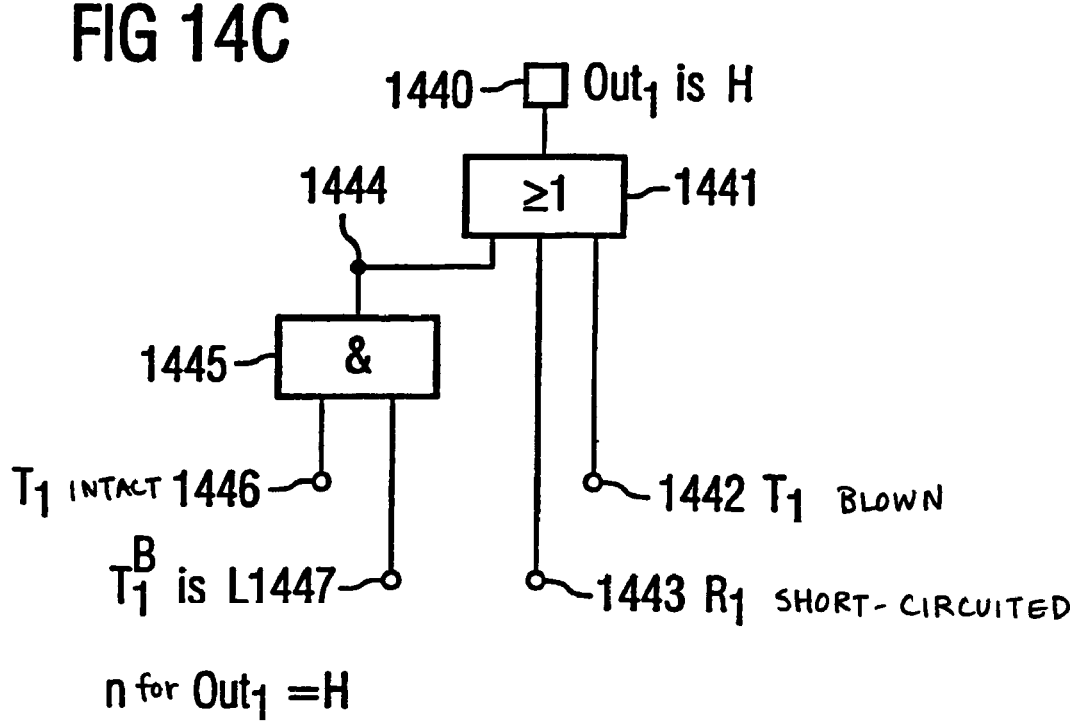

The corresponding error tree is represented in FIG. 14c. According to this, a High level for the output signal $Out_1$ 1440 results due to an INCLUSIVE-OR operation 1441 of the events that the transistor $T_1$ is blown 1442, the first electrical resistor $R_1$ is short-circuited 1443 and a second AND interim signal 1444, which results from an AND operation 1445 of the events that the transistor $T_1$ is intact 1446 and that a Low level exists at the base terminal $T_1^B$ of the transistor $T_1$ 1447.

The solution of equation (16) which fulfills the following conditions can be determined analogously:

$$R_1^{A1} = H \quad (21)$$

$$Out_1 = T_1^E = L \quad (22)$$

The solution is:

$$[R_1^{short} \cdot T_1^{short} + R_1^{open} \cdot T_1^{open}] + [T_1^{short}] + \quad (23)$$
$$[T_1^{OK} \cdot (T_1^B = H) \cdot (R_1^{open} + R_1^{OK})] + [T_1^{OK} \cdot R_1^{open} \cdot (T_1^B = L)]$$

This can be simplified to:

$$[T_1^{short}] + [R_1^{open}] + [T_1^{OK} \cdot R_1^{OK} \cdot (T_1^B = H)] \quad (24)$$

Figure 14D:
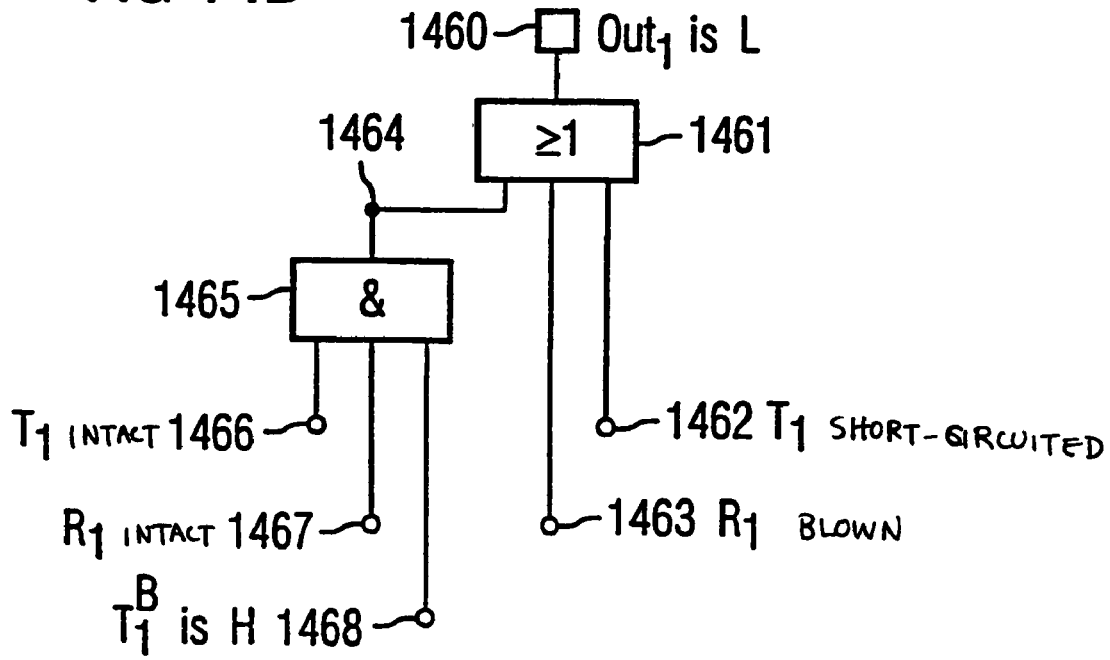

The corresponding error tree is represented in FIG. 14d. According to this, a Low level for the output signal $Out_1$ 1460 results due to an INCLUSIVE-OR operation 1461 of the events that the transistor $T_1$ is short-circuited 1462, the first resistor $R_1$ is blown 1463 and a third AND interim signal 1464, which results from an AND operation 1465 of the following events:

the transistor $T_1$ is intact 1466;
the first electrical resistor $R_1$ is intact 1467;
the base terminal $T_1^B$ of the transistor $T_1$ displays a High level 1468.

A plurality of alternatives and/or further versions of the exemplary embodiments described above are represented in the following.

Failure rates, i.e. error probabilities, can be associated with the individual elements, from which a full failure probability in relation to the predefined undesirable event can be determined in the context of an error tree analysis of the full error tree determined.

In general, an error tree analysis can be executed on the corresponding full error tree, for example according to the error tree analysis method known from (3).

Furthermore, the resultant error tree can be simplified into a cause/effect graph in which identical causes respectively occurring on multiple occasions for an event are combined and represented as a cause in the cause/effect graph.

Furthermore, the individual error probabilities for the reference elements can be expanded according to the so-called Diagnostic Coverage method to the effect that depending on the integration of a reference element as an element in an electrical circuit, the error probability of the element actually available in the electrical circuit behaves differently. This can be taken into account in the net lists, whereby an improved, more reliable full error tree can be generated.

Furthermore, the error tree can be expanded or contracted on a freely editable basis, whereby for example an expansion can be effected by the addition of a supplementary error tree. An example of such a supplementary error tree can be seen in the fact that for example requirements or an error tree describing the electromagnetic compatibility of the corresponding electrical circuit considered are added at the corresponding points of the full error tree.

Furthermore, different and/or additional types of error tree can be envisioned, for example an error tree where it is not an erroneous signal level that is considered but an erroneous change in signal level (edge change) from a High level to a Low level or from a Low level to a High level.

The invention has been described in detail with particular reference to preferred embodiments thereof and examples, but it will be understood that variations and modifications can be effected within the spirit and scope of the invention.

The invention claimed is:

1. A method for determining a full error description for at least one part of a technical system, by a computer, comprising:
describing the system by a stored system description which can be processed by the computer, the system description containing information on elements available in the system and on links between the elements;
determining an element error description for each element on which information is contained in the system description, the element error description being determined using a stored error description which is respectively associated with a reference element, describing possible errors of the reference element with the element error description, and describing possible errors of a respective element with an error description of the reference element;
grouping at least a portion of the reference elements into a reference element group based on the stored system description;
determining a group error description for the elements of the reference element group using one of a plurality of stored group error descriptions, each of which is respectively associated with a specific reference element group, each stored group error description describing possible errors of the elements of the respective reference element group, the group error description specifying at least one error which has an effect on all elements of the reference group and specifying how the error affects the elements of the reference element group by taking into account the links between the elements from the stored system description; and
determining a full error description from the element error descriptions and the group error descriptions taking into account the links between the elements,
where the full error description is determined as a full error tree, and
where the full error tree is changed by varying a framework condition.

2. The method as claimed in claim 1, where the framework condition is varied by adding a supplementary error tree.

3. The method as claimed in claim 1, where the framework condition describes electromagnetic compatibility.

4. A system to determine a full error description of at least one part of a technical system, comprising:
a processor to:
describe the system by a system description, the system description containing information on elements available in the system and on links between the elements;
determine an element error description for each element on which information is contained in the system description, the element error description being determined using a stored error description which is respectively associated with a reference element;
describe possible errors of the reference element with the element error descriptions;
describe possible errors of a respective element with an error description of the reference element;
group at least a portion of the reference elements into a reference element group based on the system description;
determine a group error description for the elements of the reference element group using one of a plurality of stored group error descriptions, each of which is respectively associated with a specific reference element group, each stored group error description describing possible errors of the elements of the respective reference element group, the group error description specifying at least one error which has an effect on all elements of the reference group and specifying how the error affects the elements of the reference element group by taking into account the links between the elements from the stored system description; and
determine a full error description from the element error descriptions and the group error descriptions, taking into account the links between the elements; and
at least one memory that holds information comprising:
the plurality of stored error descriptions, each stored error description describing possible errors of a respectively associated reference element; and
the plurality of stored group error descriptions, each of which is associated with a respective reference element group, each stored group error description describing possible errors of the elements of the respective reference element group, each group error description specifying at least one error which has an effect on all elements of the reference group and specifying how the error affects the elements of the reference element group by taking into account the links between the elements from the system description, the processor performing in such a manner that
the full error description is determined as a full error tree, and
the full error tree is changed in relation to predefinable framework conditions.

5. The system as claimed in claim 4, where the processor performs in such a manner that the change is effected by the addition of a supplementary error tree.

6. The system as claimed in claim 4, where the framework condition describes by conditions in relation to electromagnetic compatibility.

7. A method for determining cause of a failure of an electrical circuit, by a computer, comprising:
storing a description of the electrical circuit which can be processed by the computer, including information on circuit elements of the electrical circuit and on links between the circuit elements;

selecting element error descriptions corresponding to reference circuit elements corresponding to the circuit elements of the electrical circuit from a plurality of prestored error descriptions;

grouping at least some of the circuit elements into a reference element group when based on the description of the electrical circuit, the circuit elements correspond to the same reference element;

selecting a group error description for the circuit elements of the reference element group from a plurality of prestored group error descriptions associated with reference element groups, each group error description describing possible failures of the circuit elements of the reference element group and specifying how the failures affects the circuit elements of the reference element group, by taking into account the links between the circuit elements according to the description of the electrical circuit; and determining a full error description from the element failure descriptions and the group error descriptions, as a full error tree, wherein the full error tree is used to identify the cause of the failure of the electrical circuit.

* * * * *